(12) United States Patent
Nakajima

(10) Patent No.: US 6,442,699 B1
(45) Date of Patent: Aug. 27, 2002

(54) POWER CONTROL METHOD AND APPARATUS THEREFOR

(75) Inventor: Naoki Nakajima, Amagasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/349,931

(22) Filed: Jul. 8, 1999

(30) Foreign Application Priority Data

Sep. 18, 1998 (JP) ............................................ 10-264627

(51) Int. Cl.⁷ ................................................ G06F 1/26
(52) U.S. Cl. ....................................................... 713/320
(58) Field of Search ................................ 713/300, 320, 713/322, 323, 324, 328, 340

(56) References Cited

U.S. PATENT DOCUMENTS

| | | | |
|---|---|---|---|
| 5,339,445 A | | 8/1994 | Gasztonyi |
| 5,483,656 A | * | 1/1996 | Oprescu et al. ............. 713/320 |
| 5,630,148 A | | 5/1997 | Norris |
| 5,694,607 A | * | 12/1997 | Dunstan et al. ............. 713/340 |
| 5,894,579 A | * | 4/1999 | Fujihara ...................... 713/324 |
| 5,935,252 A | * | 8/1999 | Berglund et al. ............ 713/300 |
| 5,964,879 A | * | 10/1999 | Dunstan et al. ............. 713/340 |

FOREIGN PATENT DOCUMENTS

| | | |
|---|---|---|
| EP | 0 727 728 | 8/1996 |
| JP | 4-125718 | 4/1992 |
| JP | 7-302138 | 11/1995 |
| JP | 8-503566 | 4/1996 |

OTHER PUBLICATIONS

R. Young et al.: "Adaptive Clock Speed Control For Variable Processor Loading" Motorola Technical Developments., vol. 15, May 1992.

* cited by examiner

Primary Examiner—Peter Wong
Assistant Examiner—X. Chung-Trans
(74) Attorney, Agent, or Firm—Wenderoth, Lind & Ponack, L.L.P.

(57) ABSTRACT

In a power control apparatus for controlling the power consumption of each of resources for running an application program in an electrical apparatus for running the application program, an operation status detector detects operation statuses of the application program. A load determinator determines a load on the resource in the detected operation status of the application program. A resource operation controller controls the operation of each of the resources such that the resource is operated by a load determined by the load determinator. As a result, the resource is driven by power properly required to run the application program depending on the operation status of the application program.

20 Claims, 19 Drawing Sheets

Fig. 2

Operation Status & Status Signals

| Operation | Status | S1 |
|---|---|---|
| System | System Activation Process Start | S1_S1 |
| | System Activation Process End | S1_S2 |
| | Idle Start | S1_S3 |
| | Idle End | S1_S4 |
| | Shift to Suspend | S1_S5 |
| | Return from Suspend | S1_S6 |
| | System Termination Process Start | S1_S7 |
| | System Termination Process End | S1_S8 |
| Application Program 1 - Video Image Display/Recording Application - | Activation Process Start | S1_A1_1 |
| | Activation Process End | S1_A1_2 |
| | Image Display Start | S1_A1_3 |
| | Image Display End | S1_A1_4 |
| | Video Record Start | S1_A1_5 |
| | Video Record End | S1_A1_6 |
| | Termination Process Start | S1_A1_7 |
| | Termination Process End | S1_A1_8 |
| Application Program 2 - Word Processor - | Activation Process Start | S1_A2_1 |
| | Activation Process End | S1_A2_2 |
| | Display Start | S1_A2_3 |
| | Display End | S1_A2_4 |
| | Input Process Start (Key Operation Detection) | S1_A2_5 |
| | Input Process End (Given Period Passing after Last Key Operation) | S1_A2_6 |
| | Document Save Process Start | S1_A2_7 |
| | Document Save Process End | S1_A2_8 |
| | Termination Process Start | S1_A2_9 |
| | Termination Process End | S1_A2_10 |
| Application Program 3 - Clock Display Application - | Activation Process Start | S1_A3_1 |
| | Activation Process End | S1_A3_2 |
| | Display Start | S1_A3_3 |
| | Display End | S1_A3_4 |
| | Termination Process Start | S1_A3_5 |
| | Termination Process End | S1_A3_6 |

Fig. 3

Operation Status Defined by Status Signals

| Operation | | Status | Status Signals |
|---|---|---|---|
| System | | In Activation Process | From S1_S1 till S1_S2 |
| | | In Idle | From S1_S3 till S1_S4 |
| | | In Suspend | From S1_S5 till S1_S6 |
| | | In Termination Process | From S1_S7 till S1_S8 |
| | | Termination | After S1_S8 |
| Application Program 1 - Video Image Display/Recording Application - | | In Activation Process | From S1_A1_1 till S1_A1_2 |
| | | In Image Display | From S1_A1_3 till S1_A1_4 |
| | | In Video Record | From S1_A1_5 till S1_A1_6 |
| | | In Termination Process | From S1_A1_7 till S1_A1_8 |
| Application Program 2 - Word Processor - | | In Activation Process | From S1_A2_1 till SA_A2_2 |
| | | In Display | From S1_A2_3 till SA_A2_4 |
| | | In Input | From S1_A2_5 till S1_A2_6 |
| | | In Save | From S1_A2_7 till S1_A2_8 |
| | | In Termination Process | From S1_A2_9 till S1_A2_10 |
| Application Program 3 - Clock Display Application - | | In Activation Process | From S1_A3_1 till S1_A3_2 |
| | | In Display | From S1_A3_3 till S1_A3_4 |
| | | In Termination Process | From S1_A3_5 till S1_A3_6 |

Fig. 5

Operation Rate Allocation for Entire System

| Status of System Operation | Operation Rate (%) | | | | |
|---|---|---|---|---|---|
| | CPU | HDD | LCD | Memory | VRC |
| In Activation Process | 100 | 100 | 25 | 100 | 0 |
| In Idle | 10 | 0 | 25 | 100 | 0 |
| In Suspend | 0 | 0 | 0 | 10 | 0 |
| In Termination Process | 50 | 50 | 0 | 100 | 0 |
| Termination | 0 | 0 | 0 | 0 | 0 |

Fig. 6

Operation Rate Allocation for performing Application Program 1 (Video Display/Record)

| Status of Application Program 1 | Operation Rate (%) | | | | |
|---|---|---|---|---|---|
| | CPU | HDD | LCD | Memory | VRC |
| In Activation Process | 50 | 50 | 50 | 100 | 0 |
| In Image Display | 10 | 0 | 100 | 100 | 0 |
| In Video Record | 80 | 100 | 100 | 100 | 100 |
| In Termination Process | 50 | 50 | 50 | 100 | 50 |

Fig. 7

Operation Rate Allocation for performing Application Program 2 (Word Processor)

| Status of System Operation | Operation Rate (%) | | | | |
|---|---|---|---|---|---|
| | CPU | HDD | LCD | Memory | VRC |
| In Activation Process | 50 | 50 | 50 | 100 | 0 |
| In Display | 10 | 0 | 50 | 100 | 0 |
| In Input | 50 | 20 | 50 | 100 | 0 |
| In Save | 50 | 100 | 50 | 100 | 0 |
| In Termination Process | 50 | 50 | 50 | 100 | 0 |

Fig. 8

Operation Rate Allocation for performing Application Program 3 (Clock Display)

| Status of Application Program 1 | Operation Rate (%) | | | | |
|---|---|---|---|---|---|
| | CPU | HDD | LCD | Memory | VRC |
| In Activation Process | 10 | 20 | 25 | 100 | 0 |
| In Display | 10 | 0 | 25 | 100 | 0 |
| In Termination Process | 50 | 50 | 25 | 100 | 0 |

*Fig. 9*

Calculation of Operation Rate for Allocation

| Resource | Allocation |
|---|---|
| CPU | Sum of each of Operation Rates. If the sum is over 100%, the sum is set at 100%. |
| HDD | Sum of each of Operation Rates. If the sum is over 100%, the sum is set at 100%. |
| LCD | The maximum vale of Operation Rates. |
| Memory | Sum of each of Operation Rates. If the sum is over 100%, the sum is set at 100%. |
| VRC | Sum of each of Operation Rates. If the sum is over 100%, the sum is set at 100%. |

*Fig. 10*

Operation Rate Allocation for performing Application Program 1 (in Display) and Application Program 2 (In Input) simultaneously.

| Operation Status of Application Programs | Operation Rate (%) | | | | |
|---|---|---|---|---|---|
| | CPU | HDD | LCD | Memory | VRC |
| Application Program 1 In Image Display | 10 | 0 | 100 | 100 | 0 |
| Application Program 2 In Input | 50 | 20 | 50 | 100 | 0 |
| Operation Rate shall be set at | 60 | 20 | 100 | 100 | 0 |

Fig. 11

Operation Rate Allocation for performing Application Program 1 (in Display),
Application Program 2 (In Input), and Application Program 3 simultaneously.

| Operation Status of Application Programs | Operation Rate (%) | | | | |
|---|---|---|---|---|---|
| | CPU | HDD | LCD | Memory | VRC |
| Application Program 1 In Video Record | 80 | 100 | 100 | 100 | 100 |
| Application Program 2 In Display | 10 | 0 | 50 | 100 | 0 |
| Application Program 3 In Display | 10 | 0 | 25 | 100 | 0 |
| Operation Rate shall be set at | 100 | 100 | 100 | 100 | 100 |

*Fig. 14*

Operation Rate Allocation for Entire System

| Status of System Operation | Operation Rate (%) | | | |
|---|---|---|---|---|
| | CPU | HDD | LCD | Memory |
| In Activation Process | 100 | 100 | 25 | 100 |
| In Idle | 10 | 0 | 25 | 100 |
| In Suspend | 0 | 0 | 0 | 10 |
| In Termination Process | 50 | 50 | 0 | 100 |
| Termination | 0 | 0 | 0 | 0 |

*Fig. 15*

Operation Rate peculiar to Application Program (Video Display/Record)

| Status of Application Program 1 | Operation Rate (%) | | | |
|---|---|---|---|---|
| | CPU | HDD | LCD | VRC |
| In Activation Process | 50 | 50 | 50 | 0 |
| In Display | 10 | 0 | 100 | 0 |
| In Video Record | 80 | 100 | 100 | 100 |
| In Termination Process | 50 | 50 | 50 | 0 |

Fig. 16

Standard Operation Rate: Termination of Activation Procee

| Status of | Opearation Rate (%) | | |
|---|---|---|---|
| Application Program | CPU | HDD | LCD |
| In Activation Process | 50 | 50 | 50 |
| In Termination Process | 50 | 50 | 50 |

Fig. 17

Standard Operation Rate for input by Key operation

| Status of | Opearation Rate (%) | |
|---|---|---|
| Application Program | CPU | HDD |
| In Wait for Key Operation | 30 | 0 |
| In Key Operation | 50 | 50 |
| In Character Conversion | 50 | 100 |

Fig. 18

Standard Operation Rate for Modem

| Status of | Opearation Rate (%) | |
|---|---|---|
| Application Program | CPU | Modem |
| In Wait (Open) | 10 | 50 |
| In Communication (Open) | 50 | 100 |
| Close | 0 | 0 |

Fig. 19

Standard Operation Rate for IrDA

| Status of Application Program | Opearation Rate (%) | |
|---|---|---|
| | CPU | IrDA |
| In Wait (Open) | 10 | 50 |
| In Communication (Open) | 50 | 100 |
| Close | 0 | 0 |

Fig. 20

Standard Operation Rate for IEEE 1394 Interface

| Status of Application Program | Opearation Rate (%) | |
|---|---|---|
| | CPU | IEEE1394 |
| In Wait (Open) | 0 | 50 |
| In Communication (Open) | 50 | 100 |
| Close | 0 | 0 |

Fig. 21

Standard Operation Rate for USB

| Status of Application Program | Opearation Rate (%) | |
|---|---|---|
| | CPU | USB |
| In Wait (Open) | 0 | 50 |
| In Communication (Open) | 50 | 100 |
| Close | 0 | 0 |

Fig. 22

Standard Operation Rate for Audio Replay API, 3D Function API, and Video Replay API

| Operation Status of | Operation Rate (%) | | | |
|---|---|---|---|---|
| Application Programs | CPU | Audio | 3D Function | LCD |
| Audio Replay API in use | 100 | 100 | 0 | 0 |
| 3D Function API in use | 100 | 0 | 100 | 70 |
| Video Replay API in use | 100 | 100 | 0 | 70 |

*Fig. 23*

Calculation of Operation Rate for Allocation

| Resource | Allocation |
|---|---|
| CPU | Sum of each of Operation Rates. If the sum is over 100%, the sum is set at 100%. |
| HDD | Sum of each of Operation Rates. If the sum is over 100%, the sum is set at 100%. |
| LCD | The maximum vale of Operation Rates. |
| Memory | Sum of each of Operation Rates. If the sum is over 100%, the sum is set at 100%. |
| VRC | Sum of each of Operation Rates. If the sum is over 100%, the sum is set at 100%. |
| Modem | Sum of each of Operation Rates. If the sum is over 100%, the sum is set at 100%. |
| IrDA | Sum of each of Operation Rates. If the sum is over 100%, the sum is set at 100%. |
| IEEE1394 | Sum of each of Operation Rates. If the sum is over 100%, the sum is set at 100%. |
| USB | Sum of each of Operation Rates. If the sum is over 100%, the sum is set at 100%. |
| Audio | Sum of each of Operation Rates. If the sum is over 100%, the sum is set at 100%. |
| 3D Function | Sum of each of Operation Rates. If the sum is over 100%, the sum is set at 100%. |

Fig. 24

Allocation of Operation Rate for CPU: Example 1

| Status of System | Operation Rate (%) |
|---|---|
| In Idle | 10 |
| Operation Rate shall be set at | 10 |

Fig. 25

Allocation of Operation Rate for CPU: Example 2

| Status of Application Program 1 | Operation Rate (%) |
|---|---|
| In Activation | 50 |
| Operation Rate shall be set at | 50 |

Fig. 26

Allocation of Operation Rate for CPU: Example 3

| Status | Operation Rate (%) |
|---|---|
| Application Program 1 in Wait for Key Operation | 30 |
| Application Program 2 in Video Record | 80 |
| Operation Rate shall be set at | 100 |

Fig. 27

Allocation of Operation Rate for CPU: Example 4

| Status | Operation Rate (%) |
|---|---|
| Application Program 1 in Wait for Key Operation | 30 |
| Application Program 2 in Key Operation | 50 |
| Operation Rate shall be set at | 80 |

Fig. 28

Allocation of Operation Rate for Modem: Example

| Status | Operation Rate (%) |
|---|---|
| Application Program 1 in Wait for Key Operation | 0 |
| Application Program 2 in Communication | 100 |
| Operation Rate shall be set at | 100 |

Fig. 29

Allocation of Operation Rate for Audio Device: Example

| Status of Application Program 1 | Operation Rate (%) |
|---|---|
| Application Program 1 in Key Operation | 0 |
| Application Program 2, using Audio Replay API | 100 |
| Operation Rate shall be set at | 100 |

Fig. 30

Status & Signal

| Status | Signal |
|---|---|
| System Activation Process Start | MSS1 |
| System Activation Process End | MSS2 |
| Idle Start | MSS3 |
| Idle End | MSS4 |
| Shift to Suspend | MSS5 |
| Return from Suspend | MSS6 |
| System Termination Process Start | MSS7 |
| System Termination Process End | MSS8 |

Fig. 31

| Status | Signal |
|---|---|
| Activation Process Start API | MSA1 |
| Activation Process End API | MSA2 |
| Termination Process Start API | MSA3 |
| Termination Process End API | MSA4 |
| Display Start API | MSA5 |
| Display End API | MSA6 |
| Video Record Process Start API | MSA7 |
| Video Record Process End API | MSA8 |
| Key Operation API | MSA9 |
| Predetermined Period After Detection of Key Operation API | MSA10 |
| Save Process Start API | MSA11 |
| Save Process End API | MSA12 |
| Modem Open API | MSA13 |
| Modem Close API | MSA14 |
| Modem Communication Start API | MSA15 |
| Modem Communication End API | MSA16 |
| IrDA Open API | MSA17 |
| IrDA Close API | MSA18 |
| IrDA Communication Start API | MSA19 |
| IrDA Communication End API | MSA20 |
| IEEE1394 I/O Open API | MSA21 |
| IEEE1394 I/O Close API | MSA22 |
| IEEE1394 I/O Communication Start API | MSA23 |
| IEEE1394 I/O Communication End API | MSA24 |
| USB Open API | MSA25 |
| USB Close API | MSA26 |
| USB Communication Start API | MSA27 |
| USB Communication End API | MSA28 |
| 3D Function Start API | MSA29 |
| 3D Function End API | MSA30 |
| Audio Replay Start API | MSA31 |
| Audio Replay End API | MSA32 |
| Video Replay Start API | MSA33 |
| Video Replay End API | MSA34 |

Fig. 32

Operation Status Defined by Status Signals

| Operation | Status | Status Signals |
|---|---|---|
| System | In Activation Process | From MSS1 till MSS2 |
| | In Idle | From MSS3 till MSS4 |
| | In Suspend | From MSS5 till MSS6 |
| | In Termination Process | From MSS7 till MSS8 |
| | Termination | After MSS8 |
| Standard Application Program | In Activation Process | From MSA1 till MSA2 |
| | In Image Display | From MSA5 till MSA6 |
| | In Video Record | From MSA7 till MSA8 |
| | In Input | From MSA9 till MSA10 |
| | In Wait | From MSA10 till MSA9 |
| | In Save Process | From MSA11 till MSA12 |
| | Modem Open | From MSA13 till MSA14 |
| | Modem in Communication | From MSA15 till MSA16 |
| | IrDA Open | From MSA17 till MSA18 |
| | IrDA in Communication | From MSA19 till MSA20 |
| | IEEE1394 I/O Open | From MSA21 till MSA22 |
| | IEEE1394 I/O in Com. | From MSA23 till MSA24 |
| | USB Open | From MSA25 till MSA26 |
| | USB in Com. | From MSA27 till MSA28 |
| | 3D Function in Act | From MSA29 till MSA30 |
| | Audio Replay | From MSA31 till MSA32 |
| | In Video Replay | From MSA33 till MSA34 |
| | In Termination Process | From MSA3 till MSA4 |
| Application Program For Video Display/Record | In Activation Process | From MSA1 till MSA2 |
| | In Display | From MSA5 till MSA6 |
| | In Video Record | From MSA7 till MSA8 |
| | In Termination Process | From MSA3 till MSA4 |

POWER CONTROL METHOD AND APPARATUS THEREFOR

BACKGROUND OF THE INVENTION

1. Field of the Invention

The present invention relates to a method of controlling the power consumption in an information processor such as a personal computer depending on the change in the operating status of a running application program in the information processor, and more specifically, to a power control method which is used for a portable personal computer which can be driven by batteries and an apparatus therefor.

2. Description of the Related Art

Conventionally in a personal computer which can be driven by batteries, a method of controlling power depending on the operating status of an application program is roughly classified into four types described below.

The first method is "Power Saving Control System" described in Japanese Patent Laying-Open No. 4-125718. In this method, when a state where an application program waits for input and a state where there is no input from an input device are continued for a predetermined time period, the supply of a clock from a CPU and the supply of power is stopped. As a result, the power consumption is reduced, to extend the operating time of the batteries or reduce the battery capacity. That is, the method is a method of saving, when there is a little or no load inputted to the CPU, power by uniformly bringing the CPU into a dormant state.

The second method is "Electronic Equipment And Its Power Control Method" described in Japanese Patent Laying-Open No. 7-302138. In this method, a history of accesses to each device is first recorded for each application program. On the basis of the recording of the history of accesses, the time when the application program accesses the device is then predicted. The transition of the device to a power saving mode is then made on the basis of the predicted time. That is, the method is a method of comparing an amount of saved power which can be expected by making the transition of the device to the power saving mode from the current time to the predicted time with an amount of power required to return the device to a normal mode at the predicted time, to control the operation mode of the device such that the power consumption is made smaller.

The third method is "Method of Autonomously Reducing Power Consumption in a computer system by compiling a history of power consumption" described in Published Japanese Translation of PCT International Publication for Patent Application No. 8-503566 (Corresponding U.S. Pat. No. 5,339,445). In this method, the power consumption of a power consumption equipment in the computer system is monitored while an application program is being operated, and is recorded on a table of the computer system for holding the characteristics of resources of the system. The method is a method of calling the characteristics of the required resource when the application program is operated again, and automatically adjusting power supplied to the equipment in the computer system, to reduce the power consumption of the computer system.

The fourth method is a power control method generally used for an information processor which can be driven by both AC power and batteries which are supplied to homes and offices. In this method, it is judged whether the information processor is driven by the AC power or the batteries. When the information processor is driven by the batteries, it is operated using a power control method which has been previously set by a user. In this method, the operating speed of a CPU and the luminance of an LCD are reduced to fixed values designated by the user when the information processor is driven by the batteries to reduce the power consumption, thereby extending the driving time by the batteries.

The above-mentioned conventional power control method cannot cope with a rapid increase in the application program making maximum use of the performances of the CPU and peripherals obtained by recent rapid improvement of the processing speed of the CPU and the performance of the peripherals such as hard disk. Typical examples of such an application program are application software for reproducing a moving image or performing processing of the moving image such as recording of the moving image and application software for realizing a modem function.

Under such circumferences, when power is controlled by a method of uniformly reducing the operation speed of the CPU and the power consumption of the peripherals to fixed values, as in the above-mentioned first and fourth power control methods, a moving image processing application program or the like making maximum use of the performances of the CPU and the peripherals cannot be operated. Alternatively, the performances thereof cannot be sufficiently exhibited.

The above-mentioned second and third power control methods are superior in that power is controlled for each device used by the application program. When there is a request to particularly make maximum use of the performances of the CPU and the peripherals, as at the time of starting the application program and at the time of reproducing the moving image, in running the application program, the speed of the CPU and the amount of power are not changed depending on the request. When the load required of the resource greatly varies for each hardware depending on the contents of the operation of the application program, power control properly corresponding to the variation in the request is impossible. Accordingly, the application program cannot, in some cases, be operated, or the performances of the CPU and the peripherals cannot, in some cases, be sufficiently exhibited, as in the first and fourth power control methods.

In any of the conventional power control methods, in order to control power while properly running the application program, a user must previously set the power control method in detail or must always set the speed of the CPU to a sufficiently large value. It is very troublesome to sequentially and manually set the power control method in detail while the application program is running. Even if such troublesome detailed setting is performed, it is very difficult to perform the detailed setting at correct timing while the application program is running. If the speed of the CPU is fixedly set to a sufficiently large value, the power consumption is unnecessarily increased, and the driving time by the batteries is decreased. Therefore, the original object of the power control cannot be attained.

In the above-mentioned conventional power control method, an object is to extend the driving time of the information equipment driven by batteries, or reduce the size of the batteries in order to provide the same driving time. Therefore, the power control is considered only from the point of view of how power supplied to each of resources of the hardware is reduced at the time of running the application program. Therefore, the application program cannot be run normally, although the power consumption can be reduced, as described above.

Currently, global warming and exhaustion of energy resources are actually great problems. The reduction in the power consumption is not merely limited to the information equipment driven by batteries, but is a technique required of the overall electrical apparatus driven by AC power.

In running the application program, therefore, the minimum power required to properly drive each of the resources of the hardware must be supplied depending on the change in a state where the application program is running. In running the application program, therefore, power is prevented from being excessively supplied to the hardware any more than necessary to run the application program, to prevent the excessive power from being uselessly consumed. As a result, in running the application program, the power can be efficiently utilized without being uselessly utilized, and the power consumption can be reduced.

The present invention has been made in order to solve the above-mentioned problem and has for its object to provide a power control method, which is used in an electrical apparatus represented by an information apparatus, for properly and effectively distributing power among the resources depending on a state where the application program is running to prevent the power from being uselessly consumed by being excessively supplied, thereby reducing power consumption and an apparatus therefor.

SUMMARY OF THE INVENTION

The object of the present invention is therefore to resolve the above-noted problems by providing a power control method and apparatus therefor.

To achieve this object, a first aspect of the present invention is directed to a power control apparatus for controlling, in an electrical apparatus for running the application program, the power consumption of each of resources for running the application program, comprising:

- an operation status detector for detecting operation statuses of the application program;
- a load determinator for determining a load required of the resource in the detected operation status of the application program; and
- a resource operation controller for controlling an operation parameter which affects a load on each of the resources such that the resource is operated by the load determined by the load determinator,
- the resource being driven by power suited to run the application program by the variation in the load depending on the operation status of the application program.

As described above, in the first aspect of the present invention, each of the resources is operated by an amount of power actually required to run the application program, thereby making it possible to prevent power from being unnecessarily consumed.

A second aspect of the present invention is characterized in that in the first aspect, the load determinator comprise

- a load factor storage for storing a load factor for the resource which is previously set depending on the operation status of the application program, and
- a load factor acquisition for reading out from the load factor storage a load factor for the resource corresponding to the operation status detected by the operation status detector,
- the load factor being set in a range peculiar to the resource depending on the load.

As described above, in the second aspect of the present invention, even when the load factor, which has been set once, peculiar to the resource is changed, or the resource is replaced with another resource, or when the operation of the application program is changed, the load factor can be reset to a proper value.

A third aspect of the present invention is characterized in that in the second aspect, the load determinator further comprise

- a load factor integrator for integrating, when a plurality of load factors are acquired for the same resource by the load factor acquisition, the plurality of load factors,
- the resource to which the plurality of loads are simultaneously applied being driven by power sufficient for the loads.

As described above, in the third aspect of the present invention, the loads simultaneously required of the same resource can be correctly determined depending on the load corresponding to the entire system in performing each of operations of the application program.

A fourth aspect of the present invention is characterized in that in the third aspect, the load factor integrator integrates, when the sum of the plurality of load factors acquired for the same resource is not more than 100%, the plurality of load factors into the sum of the load factors, while integrating, when the sum of the plurality of load factors is not less than 100%, the load factors into 100%, to prevent the loads from being applied to the resource in excess of the maximum capability of the resource.

As described above, in the fourth aspect of the present invention, it is possible to respond to a load request from the application program to the utmost depending on the actual capability of the resource.

A fifth aspect of the present invention is characterized in the first aspect, the operation status detector detects the operation status of the application program on the basis of API communication information detected by an API layer in an operation system loaded into the electrical apparatus and operation status monitor information detected by a Kernel layer.

As described above, in the fifth aspect of the present invention, the present invention is applicable to a computer system having the operation system.

A six aspect of the present invention is characterized in that in the third aspect, the load factor integrator supplies the load factor obtained by the integration to a driver interface layer in the operation system loaded into the electrical apparatus.

As described above, in the sixth aspect of the present invention, the present invention is applicable to a computer system having the operation system.

A seventh aspect of the present invention is characterized in that in the sixth aspect, the driver interface layer supplies the load factor obtained by the integration to drivers for the corresponding resources.

As described above, in the seventh aspect of the present invention, it is possible to control the power consumption of an arbitrary peripheral connected to a computer system.

An eighth aspect of the present invention is characterized in that in the second aspect, the load factor is the operation rate for the resource.

As described above, in the eighth aspect of the present invention, it is possible to control the power consumption utilizing an operation control function provided in each of the resources.

A ninth aspect of the present invention is directed to a power control method of controlling the power consumption of each of resources for running an application program in an electrical apparatus for running the application program, comprising:

the operation status detection step of detecting operation statuses of the application program;

the load determination step of determining a load required of the resource in the detected operation status of the application program; and resource operation control step of controlling an operation parameter which affects a load on each of the resources such that the resource is operated by the load determined by the load determination step, the resource being driven by power suited to run the application program by the variation in the load depending on the operation status of the application program.

As described above, in the ninth aspect of the present invention, each of the resources is operated by an amount of power actually required to run the application program, thereby making it possible to prevent power from being unnecessarily consumed.

A tenth aspect of the present invention is characterized in that in the ninth aspect, the load determination step comprises the load factor storage step of storing load factors for the resource which are previously set depending on the operation statuses of the application program, and the load factor acquisition step of reading out a load factor for the resource corresponding to the operation status detected at the operation status detection step out of the load factors stored at the load factor storage step, the load factor being set in a range peculiar to the resource depending on the load.

As described above, in the tenth aspect of the present invention, when the load factor, which has been set once, peculiar to the resource is changed, or the resource is replaced with another resource, or when the operation of the application program is changed, the load factor can be also reset to a proper value.

An eleventh aspect of the present invention is characterized in that in the tenth aspect, the load determination step further comprises the load factor integration step of integrating, when the plurality of load factors are acquired for the same resource by the load factor acquisition step, the plurality of load factors, the resource to which the plurality of loads are simultaneously applied being driven by power sufficient for the loads.

As described above, in the eleventh aspect of the present invention, the loads simultaneously required of the same resource can be correctly determined depending on the load on the entire system in performing each of the operations of the application program.

A twelfth aspect of the present invention is characterized in that in the eleventh aspect, the load factor integration step integrates, when the sum of the plurality of load factors acquired for the same resource is not more than 100%, the plurality of load factors into the sum of the load factors, while integrating, when the sum of the plurality of load factors is not less than 100%, the load factors into 100%, to prevent the loads from being applied to the resource in excess of the maximum capability of the resource.

As described above, in the twelfth aspect of the present invention, it is possible to respond to a load request from the application program to the utmost depending on the actual capability of the resource.

A thirteenth aspect of the present invention is characterized in that in the ninth aspect, the operation status detection step detects the operation status of the application program on the basis of API communication information detected by an API layer in the operation system loaded into the electrical apparatus and operation status monitor information detected by a Kernel layer.

As described above, in the thirteenth aspect of the present invention, the present invention is applicable to a computer system having the operation system.

A fourteenth aspect of the present invention is characterized in that in the eleventh aspect, the load factor obtained by the integration at the load factor integration step is supplied to a driver interface layer in the operation system loaded into the electrical apparatus.

As described above, in the fourteenth aspect of the present invention, the present invention is applicable to a computer system having the operation system.

A fifteenth aspect of the present invention is characterized in that in the fourteenth aspect, the driver interface layer supplies the load factor obtained by the integration to drivers for the corresponding resources.

As described above, in the fifteenth aspect of the present invention, it is possible to control the power consumption of the arbitrary peripheral connected to a computer system.

A sixteenth aspect of the present invention is characterized in that in the tenth aspect, the load factor is the operation rate for the resource.

As described above, in the sixteenth aspect of the present invention, it is possible to control the power consumption utilizing an operation control function provided in each of the resources.

A seventeenth aspect of the present invention is directed to a computer program capable of running on a computer so that the system comprising the computer program plus the computer carries out a method according to any one of the ninth through sixteenth aspects.

An eighteenth aspect of the present invention is directed to a computer program loadable into a computer so that the computer programmed in this way is capable of carrying out a method according to any one of the ninth through sixteenth aspects.

A nineteenth aspect of the present invention is directed to a computer program product comprising a computer readable medium, having thereon: computer program code means, when the program is loaded, to make the computer execute a method according to any one of the ninth through the sixteenth aspects.

A twentieth aspect of the present invention is characterized in that in the first aspect, the load determinator further determines a load required for each of the different resources, so that each of the resources is driven by power suited to run the application program by the variation in the load depending on the operation status of the application program.

A twenty-first aspect of the present invention is characterized in that the load determination step further determines a load required for each of different resources, so that each of the resources is driven by power suited to run the application program by the variation in the load depending on the operation status of the application program.

BRIEF DESCRIPTION OF THE DRAWINGS

The present invention will become more fully understood from the detailed description given below and the accompanying drawings wherein:

FIG. 2 is a table showing a specific example of operation status signals produced by an operation status detector shown in FIG. 1;

FIG. 3 is a table showing a specific example of statuses detected by the operation status detector shown in FIG. 1 and operation status signals outputted by the operation status detector;

FIG. 5 is a table showing an example of set values of power parameters for the entire system which are stored in a service power rate storage shown in FIG. 1;

FIG. 6 is a table showing an example of the allocation of power parameters set in correspondence with operation statuses of an application program 1;

FIG. 7 is a table showing an example of power parameters set in correspondence with operation statuses of an application program 2;

FIG. 8 is a table showing an example of power parameters set in correspondence with operation statuses of an application program 3;

FIG. 9 is a table showing an example of a method of calculating the value of a power parameter for each of devices in consideration of the entire system from respective power parameters corresponding to operation statuses of an application program;

FIG. 10 is a table showing the calculation of power parameters in a case where two application programs are running;

FIG. 11 is a table showing the calculation of power parameters for each of devices in consideration of the entire system in which three application programs are running;

FIGS. 14 to 22 are tables each showing power parameters referred to in the flow chart shown in FIG. 13;

FIG. 23 is a table showing a method of the calculation of power parameters which is done by a service power rate calculator at the step S9 shown in FIG. 13;

FIGS. 24 to 29 are tables showing a method of the calculation of power parameters which is done by a service power rate calculator;

FIG. 30 is a table showing the contents of an operation status monitor signal outputted by a Kernel layer;

FIG. 31 is a table showing the contents of API communication information outputted by an API layer; and FIG. 32 is a table showing statuses detected by an operation status detector while an electrical apparatus incorporating the power control apparatus shown in FIG. 12 is being operated and the contents of an operation status signal outputted by the operation status detector.

DESCRIPTION OF THE PREFERRED EMBODIMENTS

First referring now to FIGS. 1 to 11, a power control apparatus according to a first embodiment of the present invention will be described. Then referring to FIGS. 12 to 32, a power control apparatus according to a second embodiment of the present invention will be described.

(First Embodiment)

Figure 1:
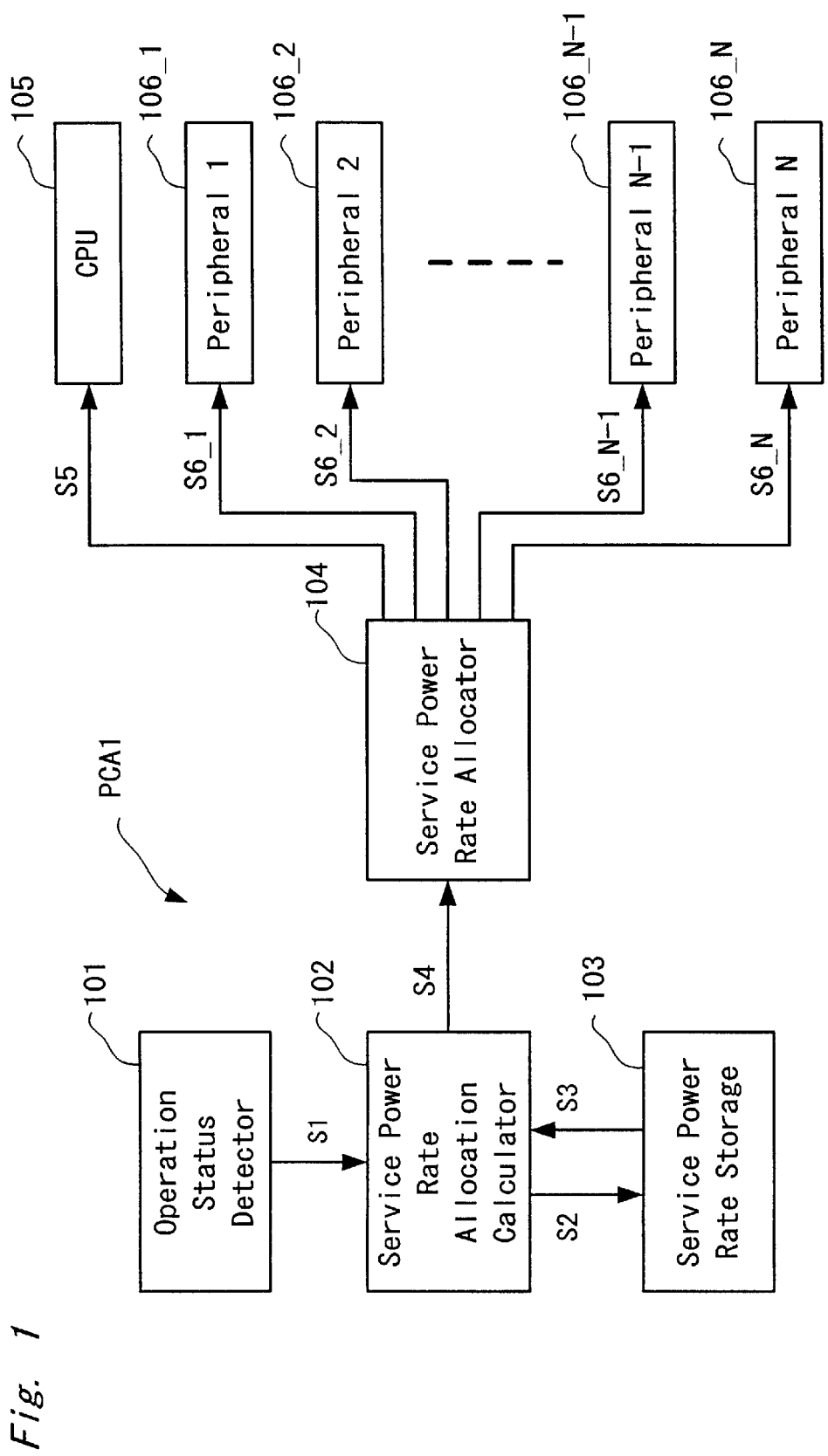
FIG. 1 is a block diagram showing the configuration of a power control apparatus according to a first embodiment of the present invention.

FIG. 1 illustrates the configuration of a power control apparatus according to a first embodiment of the present invention. A power control apparatus PCA1 comprises an operation status detector 101, a service power rate allocation calculator 102, a service power rate storage 103, a service power rate allocator 104, a CPU 105, and N (N is a positive integer) peripherals 106_1 to 106_N.

The operation status detector 101 detects the operation status of an application program to be run in an electrical apparatus, such as a portable information equipment, incorporating the power control apparatus PCA1. That is, the operation status detector 101 detects that the application program is activated or terminated, or the operation status of the application program is changed. Further, the operation status detector 101 produces an operation signal S1 representing the detected operation status.

The service power rate allocation calculator 102 calculates a service power rate for each of resources of hardware in the electrical apparatus incorporating the power control apparatus PCA1 depending on the change in the operation status of the application program on the basis of the operation status signal S1 inputted from the operation status detector 101. The service power rate means the rate of an amount of power supply actually provided to each of the resources in terms of percentage in a case where an amount of power supply required for the resource to be operated upon completely exhibiting its own capability is taken as 100%.

In the present invention, this is processing performed in view of the point that each of the resources need not be always operated at 100% in order to satisfy a request from the application program. That is, the capability actually required of the resource differs depending on the operation status of the application program. Therefore, the service power rate for each of the resources is properly calculated in order that the resource can exhibit as necessary and sufficient a capability as possible with respect to the operation status of the application program on the basis of the operation status signal S1.

The service power rate allocation calculator 102 produces, when a service power rate for each of the resources with respect to the operation status defined by the operation status signal S1 is uniquely defined (predetermined), a service power rate signal S4 representing the defined service power rate, and outputs the service power rate signal S4 to the service power rate allocator 104. On the other hand, it produces, when the service power rate for each of the resources with respect to the operation status defined by the operation status signal S1 is not uniquely defined, a service power rate inquiry signal S2 on the basis of the operation status signal S1, and outputs the service power rate inquiry signal S2 to the service power rate storage 103.

The service power rate storage 103 stores service power rates, in the operation statuses of the application program, properly predetermined for each of the resources in the electrical apparatus incorporating the power control apparatus PCA1. The service power rates stored in the service power rate storage 103 are changed as required. The service power rate storage 103 selects the service power rate, corresponding to the operation status of the application program which is represented by the service power rate inquiry signal S2, out of the service power rates stored in itself. The service power rate storage 103 produces a service power rate signal S3 representing the selected service power rate, and outputs the service power rate signal S3 to the service power rate allocation calculator 102.

The service power rate allocation calculator 102 integrates, for each of the operation statuses of the application program which is read out of the service power rate storage 103, a plurality of power parameters respectively set for the resources, and determines the final power parameter. Further, the service power rate allocation calculator 102 sets the power parameter in the service power rate allocator 104. That is, the service power rate allocation calculator 102 recalculates, on the basis of the service power rate signal S3 representing a service power rate predetermined for each of the resources, the service power rate for the resource with respect to the whole of the resources currently required to run the operation of application program. The service power rate allocation calculator 102 outputs the recalculated service power rate as the above-mentioned service power rate signal S4 to the service power rate allocator 104.

The service power rate allocator 104 performs setting of a power load on the CPU 105 and the N peripherals 106_1 to 106_N. That is, the service power rate allocator 104 allocates the actual service power rate to each of the resources required to be operated on the basis of the service power rate signal S4. Further, the service power rate allocator 104 produces a service power rate allocation signal S5 representing the service power rate allocated to the CPU 105 which is the resource, and outputs the service power rate allocation signal S5 to the CPU 105. Similarly, the service power rate allocator 104 produces service power rate allocation signals S6_1 to S6_N representing the service power rates respectively allocated to the N peripherals 106_1 to 106_N, and outputs the service power rate allocation signals S6_1 to S6_N, respectively, to the peripherals 106_1 to 106_N. In this sense, the operation rate is a parameter for determining the power load on the resource.

As described above, in the present specification, description was made of the basic concept of the present invention that a service power rate necessary and sufficient to operate a resource so as to exhibit its necessary and sufficient performance depending on the operation status of an application program. In order to actually distribute and supply power at a service power rate which actually differs for each resource, however, a huge power distribution and supply device is currently required. Further, the power consumption of the power distribution and supply device itself cannot be ignored. In the present embodiment, therefore, an operation rate for each resource is calculated in place of the service power rate. The operation rate means the rate at which the resource is actually operated in terms of percentage when a state where the resource is operated upon completely exhibiting its capability is taken as 100%. The power consumption of the resource is proportional to the operation rate. Therefore, the power consumption of the resource can be changed by changing the operation rate for the resource. Therefore, the same effect as that in adjusting the service power rate for the resource is obtained by adjusting the operation rate for the resource.

That is, more preferably in the present embodiment, the service power rate allocation calculator 102 calculates the operation rate for each of the resources of the hardware in the electrical apparatus incorporating the power control apparatus PCA1 depending on the change in the operation status of the application program on the basis of the operation status signal S1 inputted from the operation status detector 101.

The service power rate allocation calculator 102 produces, when an operation rate for each of the resources with respect to the operation status defined by the operation status signal S1 is uniquely defined (predetermined), an operation rate signal S4 representing the defined operation rate, and outputs the operation rate signal S4 to the service power rate allocator 104. On the other hand, it produces, when the operation rate for each of the resources with respect to the operation status defined by the operation status signal S1 is not uniquely defined, an operation rate inquiry signal S2 on the basis of the operation status signal S1, and outputs the operation rate inquiry signal S2 to the service power rate storage 103.

The service power rate storage 103 stores operation rates, corresponding to the service power rates in the operation statuses of the application program, properly predetermined for each of the resources in the electrical apparatus incorporating the power control apparatus PCA1. The operation rates stored in the service power rate storage 103 are changed as required. The service power rate storage 103 selects the operation rate, corresponding to the operation status of the application program which is represented by the operation rate inquiry signal S2, out of the operation rates stored in itself. The service power rate storage 103 produces a selected operation rate signal S3 representing the selected operation rate, and outputs the selected operation rate signal S3 to the service power rate allocation calculator 102.

The service power rate allocation calculator 102 integrates, for each of the operation statuses of the application program which is read out of the service power rate storage 103, a plurality of power parameters respectively set for the resource, and determines the final power parameter. Further, the service power rate allocation calculator 102 sets the power parameter in the service power rate allocator 104. That is, the service power rate allocation calculator 102 recalculates, on the basis of the operation rate signal S3 representing an operation rate predetermined for each of the resources, the operation rate for the resource with respect to the whole of the resources currently required to run the operation of the application program. The service power rate allocation calculator 102 outputs the recalculated operation rate as the above-mentioned operation rate signal S4 to the service power rate allocator 104.

The service power rate allocator 104 performs setting of a power load on the CPU 105 and the N peripherals 106_1 to 106_N. That is, the service power rate allocator 104 allocates the actual operation rate to each of the resources required to be operated on the basis of the operation rate signal S4. Further, the service power rate allocator 104 produces an operation rate allocation signal S5 representing the operation rate allocated to the CPU 105 which is the resource, and outputs the operation rate allocation signal S5 to the CPU 105. Similarly, the service power rate allocator 104 produces operation rate allocation signals S6_1 to S6_N representing the operation rates respectively allocated to the N peripherals 106_1 to 106_N and outputs the operation rate allocation signals S6_1 to S6_N.

The operation rate allocation signal S5 inputted from the service power rate allocator 104 is inputted to an operation setting portion in the CPU 105, so that the operation rate allocated to the CPU 105 is set to the operation rate designated in the operation rate allocation signal S5. As a result, the CPU 105 is operated at the designated operation rate, to provide a capability sufficient for a request of the application program in a state where the power consumption thereof is reduced. Similarly, the operation rates allocated to the peripherals 106_1 to 106_N are also set to the operation rates respectively allocated by the operation rate allocation signals S6_1 to S6_N. The peripherals 106_1 to 106_N are respectively operated at the allocated operation rates, to provide a capability sufficient for the request of the application program in a state where the power consumption thereof is reduced.

Description is made of a specific example of the operation status signal S1 with reference to FIG. 2 on the basis of the operation status inquiry signal S2 inputted from the service power rate allocation calculator 102. In FIG. 2, in a column at a left end which is displayed as "Operation", the operations of a system; electrical apparatus system incorporating the power control apparatus PCA1 and an operation system (OS), and the operations of an application programs are distinguished. "Operation" is classified into "System", "Application Program 1", "Application Program 2" and "Application Program 3".

In a column at the center which is displayed as "Status", the specific operation status in the above-mentioned "Operation" is finely classified. Further, in a column at a right end which is displayed as "S1", the operation status signal S1 described with reference to FIG. 1 is further finely classified.

That is, when the system is operated ("Operation" is "System" in FIG. 2), the operation status of the system is roughly classified into eight statuses, i.e., the status "System Activation Process Start", the status "System Activation Process End", the status "Idle Start", the status "Idle End", the status "Shift to Suspend", the status "Return from Suspend", the status "System Termination Process Start", and the status "System Termination Process End". In order to distinguish the eight statuses, suffixes S1 to S8 are given after the operation status signal S1.

That is, the status "System Activation Process Start", the status "System Activation Process End", the status "Idle Start", the status "Idle End", the status "Shift to Suspend", the status "Return from Suspend", the status "System Termination Process Start", and the status "System Termination Process End" are respectively represented by the operation status signal S1_S1, the operation status signal S1_S2, the operation status signal S1_S3, the operation status signal S1_S4, the operation status signal S1_S5, the operation status signal S1_S6, the operation status signal S1_S7, and the operation status signal S1_S8.

Similarly, when the application program 1 realizing video image display/recording is operated ("Operation" is "Application Program 1" in FIG. 2), the operation status is roughly classified into eight statuses, i.e., the status "Activation Process Start" S_A1_1, the status "Activation Process End" S1_A1_2, the status "Image Display Start" S1_A1_3, the status "Image Display End" S1_A1_4, the status "Video Record Start" S1_A1_5, the status "Video Record End" S1_A1_6, the status "Termination Process Start" S1_A1_7, and the status "Termination Process End" S1_A1_8.

Furthermore, when the application program 2 realizing a word processor is similarly operated ("Operation" is "Application Program 2" in FIG. 2), the operation status is roughly classified into ten statuses, i.e., the status "Activation Process Start" S1_A2_1, the status "Activation Process End" S1_A2_2, the status "Display Start" S1_A2_3, the status "Display End" S1_A2_4, the status "Input Process Start (Key Operation Detection)" S1_A2_5, the status "Input Process End (Given Period Passing after Last Key Operation) S1_A2_6, the status "Document Save Process Start" S1_A2_7, the status "Document Save Process End" S1_A2_8, the status "Termination Process Start" S1_A2_9, and the status "Termination Process End" S1_A2_10.

When the application program 3 is operated ("Operation" is "Application Program 3" in FIG. 2), the operation status is roughly classified into six status, i.e., the status "Activation Process Start" S1_A3_1, the status "Activation Process End" S1_A3_2, the status "Display Start" S1_A3_3, the status "Display End" S1_A3_4, the status "Termination Process Start" S1_A3_5, and the status "Termination Process End" S1_A3_6.

Referring to FIG. 3, the operation status detected by the operation status detector 101 during the operation of the electrical apparatus incorporating the power control apparatus PCA1 and the contents of the outputted operation status signal S1 will be specifically described.

The operation status of the system where "Operation" is displayed as "System" in FIG. 3 will be first described. The status of the system "In Activation Process" means a time period elapsed from the time when the operation status detector 101 outputs the operation status signal S1_S1 shown in FIG. 2 until the operation status signal S1_S2 is then outputted. The status "In Idle" means a time period elapsed from the time when the operation status signal S1_S3 is outputted until the operation status signal S1_S4 is outputted. The status "In Suspend" means a time period elapsed from the time when the operation status signal S1_S5 is outputted until the operation status signal S1_S6 is outputted. The status "In Termination Process" means a time period elapsed from the time when the operation status signal S1_S7 is outputted until the operation status signal S1_S8 is outputted. The status "Termination" means a time period elapsed from the time when the operation status signal S1_S8 is outputted.

Next, the operation status of the application program 1 where "Operation" is displayed as "Application Program 1" in FIG. 3 will be described. The status "In Activation Process" means a time period elapsed from the time when the operation status detector 101 outputs the operation status signal S1_A1_1 shown in FIG. 2 until the operation status signal S1_A1_2 is then outputted. The status "In Image Display" means a time period elapsed from the time when the operation status signal S1_A1_3 is outputted until the operation status signal S1_A1_4 is outputted. The status "In Video Record" means a time period elapsed from the time when the operation status signal S1_A1_5 is outputted until the operation status signal S1_A1_6 is outputted. The status "In Termination Process" means a time period elapsed from the time when the operation status signal S1_A1_7 is outputted until the operation status signal S1_A1_8 is outputted.

Furthermore, the operation status of the application program 2 where "Operation" is displayed as "Application Program 2" in FIG. 3 will be described. The status "In Activation Process" means a time period elapsed from the time when the operation status detector 101 outputs the operation status signal S1_A2_1 shown in FIG. 2 until the operation status signal S1_A2_2 is then outputted. The status "In Display" means a time period elapsed from the time when the operation status signal S1_A2_3 is outputted until the operation status signal S1_A2_4 is outputted. The status "In Input" means a time period elapsed from the time when the operation status signal S1_A2_5 is outputted until the operation status signal S1_A2_6 is outputted. The status "In Save" means a time period elapsed from the time when the operation status signal S1_A2_7 is outputted until the operation status signal S1_A2_8 is outputted. The status "In Termination Process" means a time period elapsed from the time when the operation status signal S1_A2_9 is outputted until the operation status signal S1_A2_10 is outputted.

The operation statuses of the application program 3 where "Operation" is displayed as "Application Program 3" in FIG. 3 will be described. The status "In Activation Process" means a time period elapsed from the time when the operation status detector 101 outputs the operation status signal S1_A3_1 shown in FIG. 2 until the operation status signal S1_A3_2 is then outputted. The status "In Display" means a time period elapsed from the time when the operation status signal S1_A3_3 is outputted until the operation status signal S1_A3_4 is outputted. The status "In Termination Process" means a time period elapsed from the time when the operation status signal S1_A3_5 is outputted until the operation status signal S1_A3_6 is outputted.

Referring now to FIGS. 2 and 3, the operation status of the electrical apparatus incorporating the power control apparatus PCA1 shown in FIG. 1 and the detection of the operation status of the power control apparatus PCA1 will be briefly described. The operation status detector 101 first outputs, when it detects the status "Activation Process Start" of the application program 1, the operation status signal S1_A1_1 to the service power rate allocation calculator 102. At the time point of the status "Activation Process End" of the application program 1, the operation status detector 101 outputs the operation status signal S1_A1_2 to the service power rate allocation calculator 102. The service power rate allocation calculator 102 recognizes, in a period elapsed from the time when it receives the operation status signal S1_A1_1 until the operation status signal S1_A1_2 is received, that the operation status of the application program 1 is "In Activation Process" on the basis of "Operation Status Defined by Status Signals" shown in FIG. 3. Similarly, the service power rate allocation calculator 102 recognizes states where the operation status of the application program 1 is "In Image Display", "In Video Record" and "In Termination Process".

Similarly, the service power rate allocation calculator 102 accurately recognizes which of "In Activation Process", "In Display", "In Input", "In Save", and "In Termination Process" is the status of the application program 2. Similarly, the service power rate allocation calculator 102 can recognize which of "In Activation Process", "In Display", and "In Termination Process" is the status of the application program 3.

Referring now to a flow chart of FIG. 4, the operation of the power control apparatus PCA1 will be described. When the power supply of the electrical apparatus incorporating the power control apparatus PCA1 is turned on, the power control apparatus PCA1 also starts its power control operation.

At the step #100, the operation status detector 101 first detects the operation status of the electrical apparatus. It produces, for each of the statuses exemplified in FIG. 2, an operation status signal S1 representing the detected operation status, and outputs the operation status signal S1 to the service power rate allocation calculator 102. The procedure advances to the step #200 which is a subroutine that acquires a power parameter corresponding to the detected operation status.

At the step #200, when an operation rate for each of the resources with respect to the operation status detected on the basis of the operation status signal S1 obtained in the operation status detector 101 is uniquely defined, an operation rate signal S4 representing the defined operation rate is produced, and is outputted to the service power rate allocator 104. On the other hand, when the operation rate for each of the resources with respect to the operation status defined by the operation status signal S1 is not uniquely determined, an operation rate inquiry signal S2 is outputted to the service power rate storage 103. The service power rate storage 103 produces a selected operation rate signal S3 representing an operation rate, corresponding to the operation status of the application program, represented by the operation rate inquiry signal S2, and outputs the selected operation rate signal S3 to the service power rate allocation calculator 102. The procedure advances to the step #300 which is a subroutine that integrates a plurality of power parameters respectively set in the resources for each of the acquired power parameters to determine the final power parameter.

At the step #300, the service power rate allocation calculator 102 recalculates, on the basis of the operation rate signal S3 representing the operation rate predetermined for each of the resources, the operation rate allocated to the resource with respect to the whole of the resources currently required to run the operation of the application program. The service power rate allocation calculator 102 outputs the recalculated operation rate as the above-mentioned operation rate signal S4 to the service power rate allocator 104. The procedure advances to a subroutine #400 that allocates the recalculated operation rate to each of the resources.

At the step #400, operation rate allocation signals S5 and S6_1 to S6_N representing the operation rates recalculated at the step #300 are respectively dispatched to the CPU 105 and the N peripherals 106_1 to 106_N. Th CPU 105 and the peripherals 106_1 to 106_N respectively reset respective operation rates therefor on the basis of the operation rate allocation signals S5 and S6_1 to S6_N which are dispatched from the service power rate allocator 104, to control the power consumption of each of the CPU and the peripherals. The procedure advances to the subsequent step #500.

At the step #500, it is judged on the basis of the above-mentioned operation status signal S1 whether the system in the electrical apparatus incorporating the power control apparatus PCA1 is terminated. When the answer is in the negative, the procedure is returned to the step #100. The procedure at the steps #200, #400, and #500 is repeated. At the time point where it is judged at the step #500 that the answer is in the affirmative, the procedure is terminated. The operation status detector 101 may output the operation status signal S1 only when the operation status is changed instead of outputting the operation status signal S1 upon sequentially detecting the operation status of the electrical apparatus at the step #100.

Referring now to FIGS. 5, 6, 7 and 8, an example of operation rates which are power parameters set for each of the resources will be shown in operation statuses of each of the system and the application program 1 to the application program 3 which are stored in the service power rate storage 103. In the drawings, in "Operation Rate", a CPU (Central Processing Unit), an HDD (Hard Disk Drive), an LCD (Liquid Crystal Display), a memory, and a VRC (Video Recording Circuit), together with operation rates (power parameters) respectively peculiar thereto, are displayed as resources, or devices depending on the statuses of each of the system and the application programs. In the configuration shown in FIG. 1, the CPU corresponds to the CPU 105, and the HDD, the LCD, the memory, and the VRC respectively correspond to the peripherals 106_1 to 106_4. Each of numerical values is represented by % (percentage), and numerical values from 0 to 100 are set. 0 means stopping the operation of the device, and 100 means operating the device at 100%.

FIG. 5 shows an example of operation rates (power parameters) set for the entire system stored in the service power rate storage 103 shown in FIG. 1. FIG. 5 shows an example of a case where the operation rates (power parameters) at the time of the statuses "In Activation Process", "In Idle", "In Suspend", "In Termination Process", and "Termination" are respectively set. In this example, the operation rates (power parameters) for the CPU, the HDD and the memory are set at 100% during the status "In Activation Process" so that the system is activated at high speed at the time of activation. On the other hand, the operation rate for the LCD is set at 25% because the LCD need not have a high luminance.

During the status "In Idle" where no application program is operated, the operation rate for the CPU is set at 10%, and the operation rate for the HDD is set at 0%, that is, the HDD is set to its stopped state. The operation rate for the LCD is set at 25% because the LCD need not have a high luminance as at the time of the status "In Activation Process". The operation rate for the memory is set at 100%.

During the status "In Suspend", the operation rates for the CPU, the HDD, and the LCD are set at 0%, to bring the CPU, the HDD, and the LCD into their stopped states. On the other hand, the operation rate for the memory is set at 10%, to hold information before the status "In Suspend".

During the status "In Termination Process", the operation rates for the CPU and the HDD are set at 50%, and the operation rate for the LCD is set at 0%. On the other hand, the operation rate for the memory is set at 100%.

At the time of the status "Termination", the operation rates for all of the CPU, the HDD, the LCD, the memory, and the VRC are set at 0%. The operation rate for the VRC is also set at 0% during the statuses "In Activation Process", "In Idle", "In Suspend", and "In Termination Process".

FIG. 6 illustrates an example of the allocation of operation rates (power parameters) set in correspondence with each of the operation statuses of the application program 1. In this example, the application program 1 performs video display/recording byway of example.

The operation rate for the CPU is set at 50% because so great an operation capability is not required with respect to the statuses "In Activation Process" and "In Termination Process". On the other hand, the operation rate for the CPU is set at 8% because quite a great operation capability is required in the status "In Video Record". At the time of the status "In Image Display", the operation rate for the CPU is set at 10% because the operation capability of the CPU is not required.

The operation rate for the HDD is set at 50% because quite an amount of data must be inputted or outputted in the statuses "In Activation Process" and "In Termination Process". On the other hand, the operation rate for the HDD is set at 100% because a large amount of data must be inputted or outputted in the status "In Video Record". The operation rate for HDD is set at 0% in the status "In Image Display", to bring the HDD into its stopped state.

The operation rate for the LCD is set at 50% because an intermediate luminance is sufficient during the statuses "In Activation Process" and "In Termination Process". The operation rate for the LCD is set at 100% in order that an image is easily seen by increasing the luminance of the LCD during the statuses "In Image Display" and "In Video Record".

The operation rate for the memory is set at 100% in all the operation statuses, to prepare for high-speed input/output of data.

An operation rate of 100% and an operation rate of 50% are respectively set for the VRC during the statuses "In Video Record" and "In Termination Process". At the time of the other statuses, however, the operation rate for the VRC is set at 0%.

FIG. 7 illustrates an example of operation rates (power parameters) set in correspondence with each of the operation statuses of the application program 2. In this example, the application program 2 is a word processor. During the statuses "In Activation Process" and "In Termination Process", the operation rates for both the CPU and the HDD are respectively set at 50% from the same reason as that described with reference to FIG. 6. Further, in the statuses "In Display", "In Input", and "In Save", the operation rate for the CPU is set at 10%, 50%, and 50% respectively. On the other hand, the operation rate for the HDD is set at 0%, 20%, and 100%.

The operation rates are determined in consideration of the following points. That is, during the status "In Display", the CPU and the HDD do not require so great capabilities, as at the time of the status "In Idle" shown in FIG. 6. During the status "In display", the user is in consideration, so that no CPU power is required to merely display a document on a screen. While the user is providing entry from a keyboard or the like, slight services are respectively required for the CPU and the HDD in order to perform character conversion(so-called kana-to-kanji conversion) and reading of a dictionary. As to a storage operation, data must be stored at high speed in the HDD.

The operation rates for the LCD, the memory, and the VRC are respectively set at 50%, 100%, and 0% in all the statuses "In Display", "In Input", "In Save", and "In Termination Process". The operation rates for the LCD, the memory, and the VRC are respectively fixedly set at 50%, 100%, and 0%. That is, the LCD can be employed as a word processor, provided that it has a certain degree of luminance.

FIG. 8 illustrates an example of operation rates (power parameters) set in correspondence with each of the operation statuses of the application program 3. In this example, the application program 3 is operated as a clock. At the time of the status "In Activation Process", the operation rates for the CPU and the HDD are respectively set at 10% and 20% because services for the CPU and the HDD are required to some extent. During the status "In Display", 10% and 0% are respectively set as the operation rates for the HDD and the CPU because the service for the HDD is not required, and the minimum service is sufficient for the CPU. In the status "In Termination Process", the operation rates for both the CPU and the HDD are set at 50% because significant services are required for the CPU and the HDD.

On the other hand, the operation rates for the LCD, the memory, and the VRC are respectively fixedly set at 25%, 100%, and 0% also with respect to the statuses "In Activation Process", "In Display", and "In Termination Process".

Referring to FIG. 9, description is made of an example of a method of recalculating, in a case where a plurality of application programs are being operated, the power parameter (operation rate) for each of the devices (resources) in consideration of the power parameter for the entire system from the respective power parameters (operation rates) corresponding to the operation statuses of each of the application programs exemplified in FIGS. 6, 7, and 8. The sum of the power parameters (operation rates), for each of the CPU, the HDD, the memory, and the VRC, corresponding to the operation statuses of the application program which is being operated is calculated. When the sum exceeds 100%, the power parameter (operation rate) for the CPU is determined to be 100% in consideration of the entire system.

The maximum of the power parameters (operation rates) corresponding to the operation statuses of the application program which is being operated is taken as the power parameter (operation rate) for the LCD in consideration of the entire system.

Referring to FIG. 10, description is made of the calculation of the power parameters (operation rates) in a case where the operation status of the application program 1 is "In Image Display" and the operation status of the application program 2 is "In Input". In this example, the application program 1 is in the status "In Image Display", to first select the row "In Image Display" shown in FIG. 6. As a result, it is found that the operation rates for the CPU, the HDD, the LCD, the memory, and the VRC are respectively set at 10%, 0%, 100%, 100%, and 0%.

The application program 2 is in the status "In Input", to then select the row "In Input" shown in FIG. 7. As a result, it is found that the operation rates for the CPU, the HDD, the LCD, the memory, and the VRC are respectively set at 50%, 20%, 50%, 100%, and 0%. The operation rate which is the power parameter is also set for each of the plurality of resources depending on the operation status of the application program, thereby making it possible to carry out power control in a two-dimensional manner with respect to the resource in the electrical apparatus.

Furthermore, the operation rate (power parameter) for each of the devices (resources) in consideration of the entire system is calculated on the basis of the method of calculation described with reference to FIG. 9. The operation rate for the CPU is 60% obtained by adding 50% to 10%. The operation rate for the HDD is 20% obtained by adding 20% to 0%. The operation rate for the LCD is 100% obtained by selecting the maximum of 100% and 50%. The operation rate for the memory is set to 100% because the result obtained in adding 100% to 100% is 200 %, which exceeds 100%. The operation rate for the VRC is 0% obtained by adding 0% to 0%. As a result, the operation rates for the CPU, the HDD, the LCD, the memory, and the VRC in consideration of the entire system are respectively set at 60%, 20%, 100%, 100%, and 0%, as shown in the lowermost row in FIG. 10.

Referring to FIG. 11, description is made of the calculation of the operation rate (power parameter) for each of the devices (resources) in consideration of the entire system in a case where the operation status of the application program 1 is "In Video Record", the operation status of the application program 2 is "In Display", and the operation status of the application program 3 is "In display". First, the application program 1 is in the status "In Video Record", to select the row "In Video Record" shown in FIG. 6. As a result, it is found that the operation rates for the CPU, the HDD, the LCD, the memory, and the VRC are respectively set at 80%, 100%, 100%, 100%, and 100%.

Then, the application program 2 is in the status "In Display", to select the row "In Display" shown in FIG. 7. As a result, it is found that the operation rates for the CPU, the HDD, the LCD, the memory, and the VRC are respectively set at 10%, 0% 50%, 100%, and 0%.

Furthermore, the application program 3 is in the status "In Display", to select the row "In Display" shown in FIG. 8. As a result, it is found that the operation rates for the CPU, the HDD, the LCD, the memory, and the VRC are respectively set at 10%, 0%, 25 %, 100%, and 0%.

In the above-mentioned rows shown in FIGS. 6, 7, and 8, the method of calculation described with reference to FIG. 9 is applied to the operation rates (power parameters) acquired for each of the devices (resources), to recalculate the acquired operation rate for the device in consideration of the operation rate of the entire system. That is, the operation rate (power parameter) for the CPU is 100% obtained by adding 10% and 10% to 80%. The operation rate for the HDD is 100% obtained by adding 0% and 0% to 100%. The operation rate for the LCD is 100% obtained by selecting the maximum of 100%, 50% and 25%. The operation rate for the memory is set at 100% because the result obtained in adding 100% and 100% to 100% is not less than 100%. The operation rate for the VRC is 100% obtained by adding 0% and 0% to 100%. As a result, all the operation rates for the CPU, the HDD, the LCD, the memory, and the VRC in consideration of the entire system are set at 100%, as shown in the lowermost row in FIG. 11.

Figure 4:
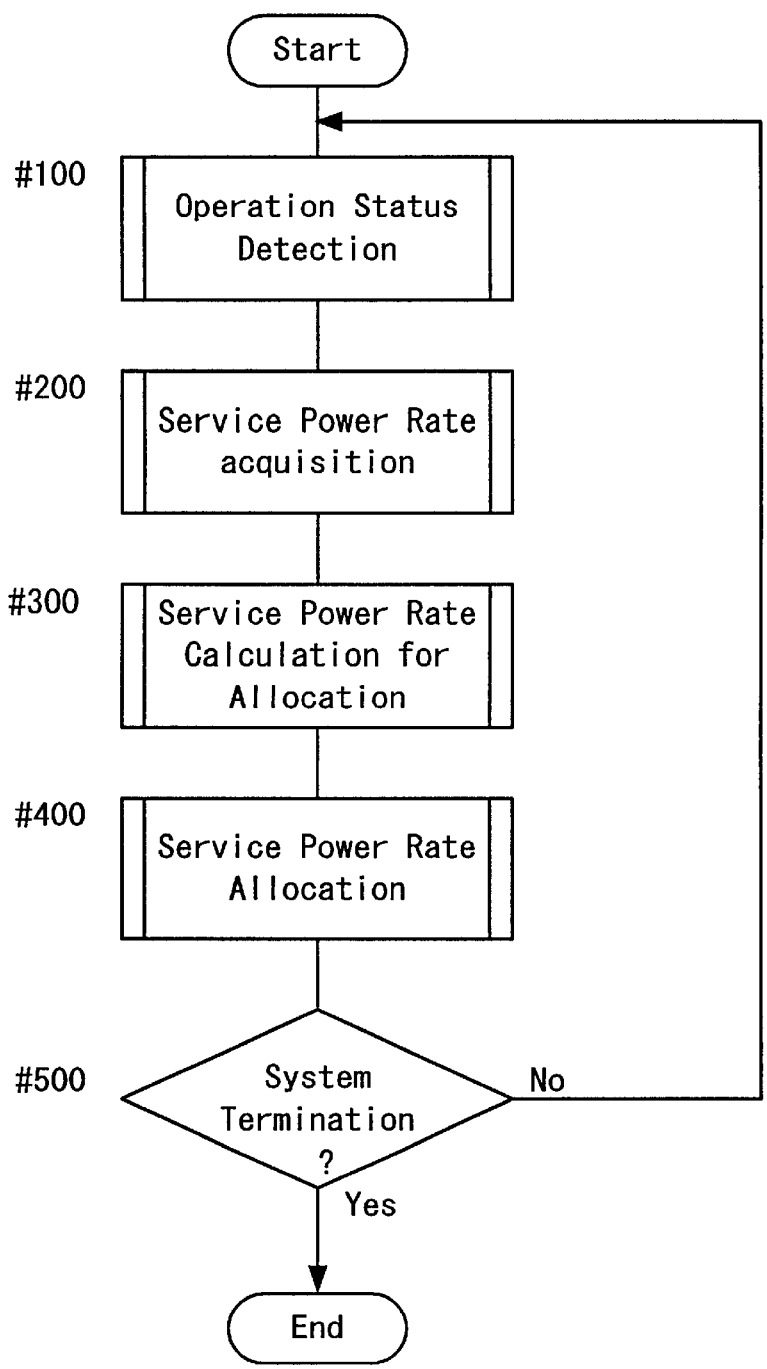
FIG. 4 is a flow chart showing the operation of the power control apparatus shown in FIG. 1.

In the above-mentioned description, the power parameters (operation rates) stored in the service power rate storage 103 are set, as exemplified in FIGS. 4, 5, and 6, for each of the application programs. However, a plurality of patterns of power parameters (operation rates) are prepared for the same application program, thereby making it possible to set power parameters (operation rates) which differ depending on the use even in the same application program. For example, in the case of the word processor which is realized by the application program 2 shown in FIG. 7, two types of patterns, that is, power parameters (operation rates) for document entry and power parameters (operation rates) for document proofing are prepared. When the application program is activated, the user selects either one of the two types of patterns, thereby making it possible to more finely control power. The above-mentioned operation rate is an example, and may be set to an arbitrary value depending on resolution which can be adjusted for each of the devices.

It goes without saying that the power parameters (operation rates) may be arbitrarily set by the user for each of the application programs instead of being previously stored in the service power rate storage 103.

(Second Embodiment)

Figure 12:
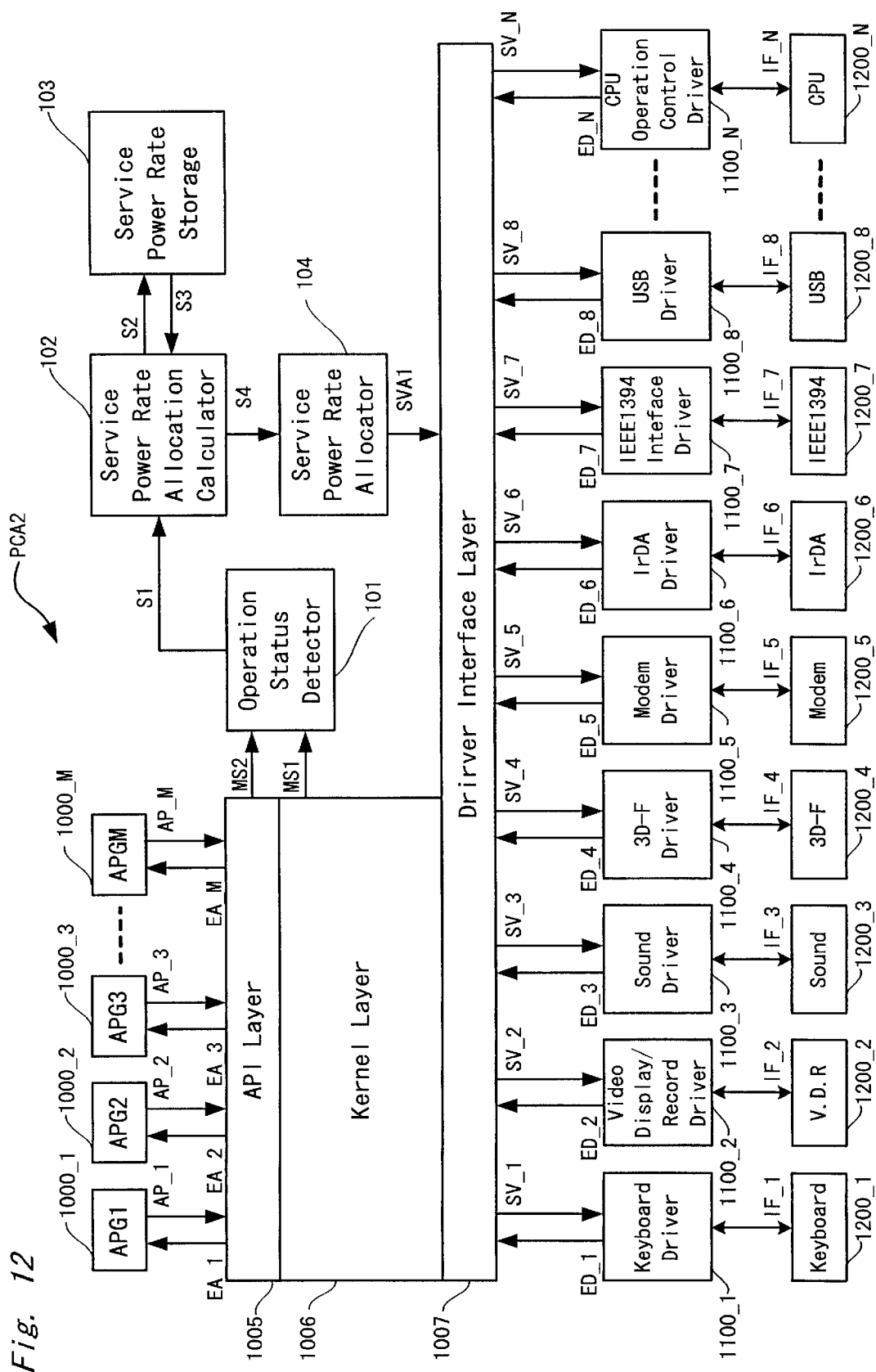
FIG. 12 is a block diagram showing the configuration of a power control apparatus according to a second embodiment of the present invention.

FIG. 12 illustrates the configuration of a power control apparatus according to a second embodiment of the present invention. A power control apparatus PCA2 according to the present embodiment is an application of the power control apparatus PCA1 according to the first embodiment described with reference to FIGS. 1 to 11 to an electrical apparatus (not shown) having an operation system (hereinafter referred to as "OS") which is represented by a personal computer or the like. The power control apparatus PCA2 comprises an operation status detector 101, a service power rate allocation calculator 102, a service power rate storage 103, and a service power rate allocator 104 which constitute the power control apparatus PCA1.

In the power control apparatus PCA2, M (M is a positive integer) application programs 1000_1 to 1000_M are application programs which are operated on the OS, and are operated utilizing an API (Application Program Interface) which is a service for the OS. In FIG. 12, the M application programs 1000_1 to 1000_M are respectively represented by APG1 to APGM.

In this example, the OS is composed of three layers, i.e., an API layer 1005, a Kernel layer 1006, and a driver interface layer 1007. The API layer 1005 is an interface between the application program and a system. The Kernel layer 1006 carries out basic control of the OS such as scheduling. The driver interface layer 1007 is an interface with various drivers.

There are N device drivers in the subordinate position of the driver interface layer 1007. Examples of the N drivers include a keyboard driver 1100_1, a video display/record driver 1100_2, a sound driver 1100_3, a 3D function driver 1100_4, a modem driver 1100_5, an IrDA driver 1100_6, an IEEE 1394 interface driver 1100_7 in conformity with the IEEE -1394 Std. High Performance Serial Bus, a USB driver 1100_8, and a CPU operation control driver 1100_N.

To the above-mentioned N device drivers, corresponding N devices are connected. Examples of the N devices include a keyboard 1200_1, a video display/recorder 1200_2, a sound processor 1200_3, a 3D function processor 1200_4, a modem 1200_5, an IrDA 1200_6, an IEEE 1394 interface 1200_7, a USB 1200_8, and a CPU operation controller 1200_N. The drivers 1100_1 to 1100_N respectively carry out control of the corresponding devices 1200_1 to 1200_N by control signals IF_1 to IF_N.

Operation rate setting signals SV_1 to SV_N and device output signals ED_1 to ED_N are respectively replaced with each other between the driver interface layer 1007 and the drivers 1100_1 to 1100_N. The operation rate setting signals SV_1 to SV_N are signals comprising various types of setting including setting of operation rates (power parameters) for each device (resource) and data. The device output signals ED_1 to ED_N are signals including the respective operation statuses of the devices 1200_1 to 1200_N and data outputted from the devices.

The Kernel layer 1006 produces an operation status monitor signal MS1 representing the operation statuses such as "In Activation Process", "In Idle", "In Suspend", and "In Termination Process". The status represented by the operation status monitor signal MS1 will be described later with reference to FIG. 30.

The API layer 1005 outputs notification signals EA_1 to EA_M for respectively notifying the application programs 1000_1 to 1000_M of information such as a keyboard event, communication data, and the like. On the other hand, the application programs 1000_1 to 1000_M respectively produce application signals AP_1 to AP_M outputted to the API layer 1005 in order to make use of the resources connected to the system.

Furthermore, the API layer 1005 monitors the notification signals EA_1 to EA_M and the application signals AP_1 to AP_M, detects the operation statuses for each of the application programs, and produces API communication information MS2 notifying the operation status detector 101 of the detected operation statuses. The operation statuses detected by the API layer 1005 will be described later with reference to FIG. 31.

The operation status detector 101 produces an operation status signal S1 on the basis of the API communication information MS2 inputted from the API layer 1005 and the operation status monitor signal MS1 inputted from the Kernel layer 1006. The service power rate allocator 104 produces an operation rate allocation signal SVA1 simultaneously including information represented by the operation rate allocation signals S5 and S6 in the power control apparatus PCA1 according to the first embodiment.

The driver interface layer 1007 produces the above-mentioned operation rate setting signals SV_1 to SV_N representing operation rates for the devices (resources) on the basis of the operation rate allocation signal SVA1 inputted from the service power rate allocator 104, and outputs the operation rate setting signals SV_1 to SV_N to the corresponding drivers 1100_1 to 1100_N. The drivers 1100_1 to 1100_N respectively produce the control signals IF_1 to IF_N on the basis of the operation rate setting signals SV_1 to SV_N, and respectively change the operation rates for the corresponding devices 1200_1 to 1200_N.

Referring to FIG. 30, description is made of the contents of the operation status monitor signal MS1 outputted from the Kernel layer 1006. When the Kernel layer 1006 detects the status "System Activation Process Start", a signal MSS1 is transmitted as the operation status monitor signal MS1 to the operation status detector 101. When the Kernel layer 1006 detects the status "System Activation Process End", a signal MSS2 is transmitted as the operation status monitor signal MS1 to the operation status detector 101. Similarly, when the Kernel layer 1006 detects the statuses "Idle Start", "Idle End", "Shift to Suspend", "Return from Suspend", "System Termination Process Start", and "System Termination Process End", signals MSS4, MSS5, MSS6, MSS7, and MSS8 are respectively outputted as the signal MS1 to the operation status detector 101.

In the power control apparatus PCA2, the operation status detector 101 produces the operation status signal S1 in accordance with a predetermined definition on the basis of the operation status monitor signal MS1 received from the Kernel layer 1006 and the API communication information MS2 received from the API layer 1005. The definition of the production of the operation status signal S1 will be described later with reference to FIG. 32.

The operation rate allocation signal SVA1 which is the output of the service power rate allocator 104 is for transmitting the power parameter (operation rate) for each of the devices set in the service power rate allocator 104 to the driver interface layer 1007. The transmitted signal is allocated to the drivers 1100_1 to 1100_N for the devices 1200_1 to 1200_N, respectively, using the operation rate setting signals SV_1 to SV_N by the driver interface layer 1007. The drivers 1100_1 to 1100_N respectively set the power parameters (operation rates) in the devices 1200_1 to 1200_N using the signals IF_1 to IF_N.

The CPU operation controller (1200_N) in the power control apparatus PCA2 differs from the CPU 105 in the power control apparatus PCA1 in that it accepts the power parameter (operation rate) by the signal IF_N from the CPU operation control driver 1100_N.

Referring now to FIG. 31, description is made of the contents of the API communication information MS2 outputted by the API layer 1005. The API layer 1005 monitors communication between the application programs 1000_1 to 1000_M and the OS (the application signals AP_1 to AP_M and the notification signals EA_1 to EA_M), so that 34 types of signals MSA1 to MSA34 are produced by way of example in correspondence with the detected operation statuses of each of the application programs. The API layer 1005 outputs each of the signals MSA1 to MSA34 as the API communication information MS2 to the operation status detector 101.

Specifically, as shown in FIG. 31, on the detection of the status "Activation Process Start API", the signal MSA1 is outputted as the API communication information MS2;

on the detection of the status "Activation Process End API", the signal MSA2 is outputted as the API communication information MS2;

on the detection of the status "Termination Process Start API", the signal MSA3 is outputted as the API communication information MS2;

on the detection of the status "Termination Process End API" the signal MSA4 is outputted as the API communication information MS2;

on the detection of the status "Display Start API", the signal MSA5 is outputted as the API communication information MS2;

on the detection of the status "Display End API", the signal MSA6 is outputted as the API communication information MS2;

on the detection of the status "Video Record Process Start API", the signal MSA7 is outputted as the API communication information MS2;

on the detection of the status "Video Record Process End API", the signal MSA8 is outputted as the API communication information MS2;

on the detection of the status "Key Operation API", the signal MSA9 is outputted as the API communication information MS2;

on the detection of the status "Predetermined Period After Detection of Key Operation API", the signal MSA10 is outputted as the API communication information MS2;

on the detection of the status "Save Process Start API", the signal MSA11 is outputted as the API communication information MS2;

on the detection of the status "Save Process End API", the signal MSA12 is outputted as the API communication information MS2;

on the detection of the status "Modem Open API", the signal MSA13 is outputted as the API communication information MS2;

on the detection of the status "Modem Close API", the signal MSA14 is outputted as the API communication information MS2;

on the detection of the status "Modem Communication Start API", the signal MSA15 is outputted as the API communication information MS2;

on the detection of the status "Modem Communication End API", the signal MSA16 is outputted as the API communication information MS2;

on the detection of the status "IrDA Open API", the signal MSA17 is outputted as the API communication information MS2;

on the detection of the status "IrDA Close API", the signal MSA18 is outputted as the API communication information MS2;

on the detection of the status "IrDA Communication Start API", the signal MSA19 is outputted as the API communication information MS2;

on the detection of the status "IrDA Communication End API", the signal MSA20 is outputted as the API communication information MS2;

on the detection of the status "IEEE 1394 I/O Open API", the signal MSA21 is outputted as the API communication information MS2;

on the detection of the status "IEEE 1394 I/O Close API", the signal MSA22 is outputted as the API communication information MS2;

on the detection of the status "IEEE 1394 I/O Communication Start API", the signal MSA23 is outputted as the API communication information MS2;

on the detection of the status "IEEE 1394 I/O Communication End API", the signal MSA24 is outputted as the API communication information MS2;

on the detection of the status "USB Open API", the signal MSA25 is outputted as the API communication information MS2;

on the detection of the status "USB Close API", the signal MSA26 is outputted as the API communication information MS2;

on the detection of the status "USB Communication Start API", the signal MSA27 is outputted as the API communication information MS2;

on the detection of the status "USB Communication End API", the signal MSA28 is outputted as the API communication information MS2;

on the detection of the status "3D Function Start API", the signal MSA29 is outputted as the API communication information MS2;

on the detection of the status "3D Function End API", the signal MSA30 is outputted as the API communication information MS2;

on the detection of the status "Audio Replay Start API", the signal MSA31 is outputted as the API communication information MS2;

on the detection of the status "Audio Replay End API", the signal MSA32 is outputted as the API communication information MS2;

on the detection of the status "Video Replay Start API", the signal MSA33 is outputted as the API communication information MS2;

on the detection of the status "Video Replay End API", the signal MSA34 is outputted as the API communication information MS2.

Figure 13:
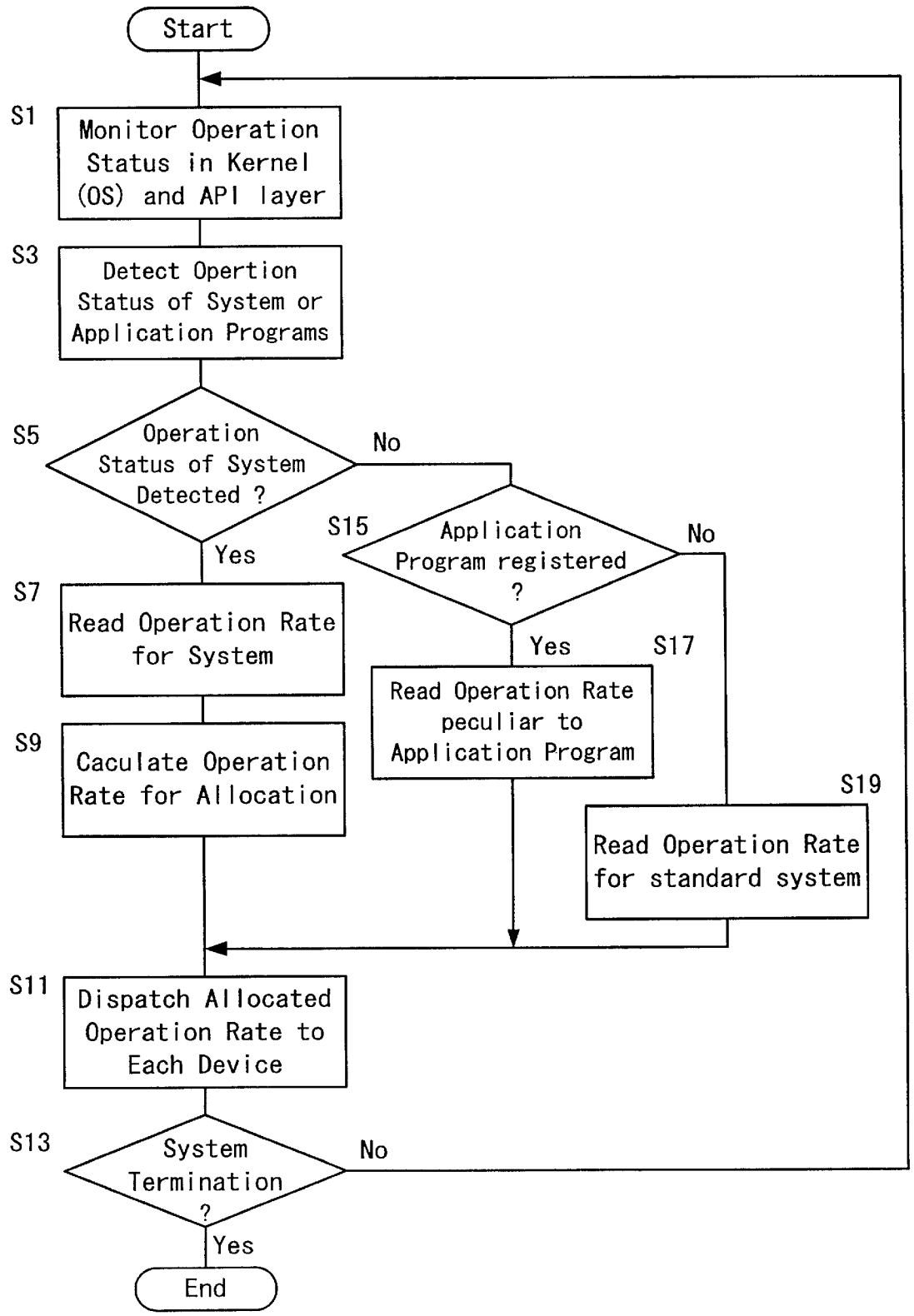
FIG. 13 is a flow chart showing the operation of the power control apparatus shown in FIG. 12.

Referring now to a flow chart of FIG. 13, description is made of the operation of the power control apparatus PCA2. The power supply of an electrical apparatus incorporating the power control apparatus PCA2 is turned on, so that the operation of the electrical apparatus is started.

At the step S1, the Kernel layer 1006 first monitors the status of the system. The API layer 1005 monitors communication between the application programs 1000_1 to 1000_M and the OS (the application signals AP_1 to AP_M and the notification signal EA_1 to EA_M). The procedure advances to the subsequent step S3.

At the step S3, monitor information of the system is inputted to the operation status detector 101 from the Kernel layer 1006 by the operation status monitor signal MS1. API communication information between each of the application programs 1000_1 to 1000_M and the OS is inputted to the operation status detector 101 from the API layer 1005 by the API communication information MS2. Specifically, the corresponding one of the signals MSA1 to MSA34 described with reference to FIG. 31 is transmitted as the API communication information MS2 to the operation status detector 101. The procedure advances to the subsequent step S5.

At the step S5, it is judged whether the operation status monitor signal MS1 received by the operation status detector 101 is related to the system. That is, when it is judged that the operation status monitor signal MS1 is related to the system, the procedure advances to the step S7. On the other hand, when it is judged that the operation status monitor signal MS1 is not related tot he system, that is, related to the application program, the procedure advances to the step S15.

At the step S7, power parameters (operation rates) to be set at the time of the corresponding status of the system is read out of a table of "Operation Rate Allocation for Entire System" stored in the service power rate storage 103. Power parameters (operation rates) for the entire system will be described later with reference to FIG. 14. The procedure advances to the subsequent step S9.

At the step S9, the service power rate allocation calculator 102 calculates a power parameter (operation rate) to be set in the service power rate allocator 104. The procedure advances to the subsequent step S11.

At the step S11, the service power rate allocator 104 outputs the power parameter (operation rate) calculated at the step S9 as the operation rate allocation signal SVA1 to the driver interface layer 1007. The driver interface layer 1007 produces the operation rate setting signals SV_1 to SV_N on the basis of the operation rate allocation signal SVA1, and outputs the operation rate setting signals SV_1 to SV_N to the corresponding device drivers 1100_1 to 1100_N. The device drivers 1100_1 to 1100_N respectively set operation rates for the corresponding devices 1200_1 to 1200_N on the basis of the operation rate setting signals SV_1 to SV_N. The procedure advances to the subsequent step S13.

At the step S13, it is judged whether the system is terminated. When the system is not terminated, it is judged that the answer is in the negative, so that the procedure is returned to the step S1. When the system is terminated, it is judged that the answer is in the affirmative, so that the procedure is terminated.

At the step S15, the service power rate allocation calculator 102 judges whether there exists a power parameter (operation rate) peculiar to the application program currently paid attention to in an operation rate table stored in the service power rate storage 103. When the power parameter (operation rate) peculiar to the application program exists in the service power rate storage 103, it is judged that the answer is in the affirmative, so that the procedure advances to the subsequent step S17. When no power parameter peculiar to the application program exists, it is judged that the answer is in the negative, so that the procedure advances to step S19.

At the step S17, the service power rate allocation calculator 102 reads out the power parameter (operation rate) with reference to a power parameter (operation rate) table peculiar to the application program stored in the service power rate storage 103. At the step S17, the power parameter (operation rate) table referred to will be described later with reference to FIG. 15. The procedure advances to the step S11.

At the step S19, the power parameter (operation rate) corresponding to the status of the detected application program is taken out with reference to a standard power parameter table stored in the service power rate storage 103. The power parameter table referred to at this step S19 will be described later with reference to FIGS. 16 to 22. The procedure advances to the foregoing step S11.

Referring now to FIGS. 14 to 22, the respective power parameters (operation rates) referred to in the flow chart shown in FIG. 13 will be described.

First, FIG. 14 shows an example of power parameters for the entire system referred to at the step S7. The power parameters (operation rates) at the time of statuses "In Activation Process", "In Idle", "In Suspend", "In Termination Process", and "Termination" are shown. In this example, when the system is "In Activation Process", the power parameters (operation rates) for the CPU, the HDD, and the memory are set at 100%, to achieve high-speed activation of the system. In the status "In Idle" where no application program is operated, the operation rate for the CPU is set at 10%, and the operation rate for the HDD is set at 0%, i.e., the HDD is set to its stopped state. In the statuses "In Activation Process" and "In Idle", the operation rate for the LCD is set at 25% because the LCD need not have a high luminance.

During the status "In Suspend", in order to store the operation status before the transition to the status "In Suspend", the operation rate for the memory is set at 10%, and the operation rates for the devices other than the memory are set at 0%, thereby preventing power from being uselessly consumed.

During the status "In Termination Process", the respective operation rates for the CPU and the HDD are set at 50%, the operation rate for the LCD is set at 0%, and the operation rate for the memory is set at 100%.

At the time of the status "Termination", the operation rates for all the CPU, the HDD, the LCD, and the memory are respectively set at 0%.

As described in the foregoing, when the application program in which peculiar power parameters are designated is being operated, not standard power parameters shown in FIG. 16 but peculiar power parameters shown in FIG. 15 are applied at the step S15. When the application program in which no peculiar power parameters are designated is being operated, standard parameters shown in FIGS. 16 to 22 are applied.

FIG. 15 shows an example of the peculiar power parameters, which correspond to the application program detected in the operation status detector 101, referred to at the step S17. In this example, the power parameters in the statuses "In Activation", "In Display", "In Video Record", and "In Termination Process" of the application program (Video Display/Record) are objects. The operation rate for the VRC is set at 100% only at the time of the status "In Video Record", while being set at 0% in the other statuses. During the status "In Activation Process" of the application program, the operation rates for the CPU, the HDD, and the LCD are set at 50%. During the status "In Display", the operation rates for the CPU, the HDD, and the LCD are respectively set at 10%, 0%, and 100%. During the status "In Video Record", the operation rates for the CPU, the HDD, and the LCD are respectively set at 80%, 100%, and 100%. During the status "In Termination Process", the operation rates for the CPU, the HDD, and the LCD are respectively set at 50%, 50%, and 50%.

Referring to FIGS. 16 to 22, the power parameter table referred to at the foregoing step S19 will be described.

FIG. 16 shows an example of the standard power parameters which are applied when no peculiar power parameters are particularly set in the application program detected by the operation status detector 101. The power parameters in each of the statuses "In Activation Process" and "In Termination Process" which are stored in the service power rate storage 103 are shown. Only the power parameters (operation rates) for the CPU, HDD, and the LCD are designated, and the other power parameters (operation rates) are 0%. In this example, the operation rates for the CPU, the HDD, and the LCD in each of the statuses "In Activation Process" and "In Termination Process" are set at 50%.

FIG. 17 shows an example of the standard power parameters (operation rates) which are applied depending on the status "Input by Key Operation" performed by the user. Only the power parameters (operation rates) for the CPU and the HDD are designated, and the other power parameters (operation rates) are 0%. At the time of the status "In Wait for Key Operation", the power parameter (operation rate) for the CPU is set at 30%, and the operation rate for the HDD is set at 0%. When the user starts the status "In Key Operation", 50% is applied as the power parameters (operation rates) for the CPU and the HDD. When a character conversion operation such as kana-to-kanji conversion is performed, high-speed reading from the HDD is generally required. Therefore, the operation rate for the HDD is set at 100%, while the operation rate for the CPU is set at 50%.

FIG. 18 shows an example of power parameters in a case where the peripheral is a modem. The open/close operation of the modem and judgement whether the modem is in communication are monitored by the API layer 1005, and is detected by the operation status detector 101. At the time of the status "Open but In Wait", the operation rate for the CPU is set at 10% because the operation of the CPU is hardly required. At this time, the modem itself is in the status "In Wait", so that the operation rate for the modem is set at 50%.

During the status "In Communication", the operation rate for the CPU is set at 50% because the CPU must be operated to some extent. In the case, the operation rate for the modem is set at 100% because the modem must communicate at high speed. On the other hand, at the time of the status "Close", the CPU and the modem need not be operated, so that the operation rates for the CPU and the modem are set at 0%.

FIG. 19 shows an example of power parameters (operation rates) for an IrDA (Infrared Communication) device. In this example, the operation rates for the CPU and the IrDA device are respectively set in a state where the modem shown in FIG. 18 is replaced with the IrDA device.

FIG. 20 shows power parameters for an IEEE 1394 device. Also in this example, in a state where the modem shown in FIG. 18 is replaced with an IEEE 1394 interface (IEEE 1394 I/F), the operation rates for the CPU and the IEEE 1394 interface are respectively set.

FIG. 21 shows an example of power parameters for a USB device. Also in this example, the operation rates for the CPU and the USB device are respectively set in a state where the modem shown in FIG. 18 is replaced with the USB device.

FIG. 22 shows an example of power parameters (operation rates), which correspond to the operation status of an API detected by the operation status detector 101. In this example, for an audio replay API, a 3D function API, and a video replay API, power parameters (operation rates) which are applied while the APIs are being used are defined. In this example, the operation rate for the CPU is always set at 100%.

During the status "Audio Replay API in use", the operation rate for an audio function is defined as 100%, and the respective operation rates for a 3D function and the LCD are set at 0% because the 3D function and the LCD are not required. During the status "3D Function API in use", the operation rate for the 3D function is set to 100%, the operation rate for the audio function is set at 0%, and the operation rate for the LCD is set at 70%.

During the status "Video Replay API in use", the operation rate for the audio function is set at 100% because data processing is performed even in the audio function. The operation rate for the 3D function is set at 0% because the 3D function is not used. On the other hand, the operation rate for the LCD is set at 70%.

Referring to FIG. 23, at the foregoing step S9, a method of the calculation of power parameters which is done by the service power rate allocation calculator 102 is shown. Power parameters (operation rates) corresponding to the status detected by the operation status detector 101 are stored in the service power rate storage 103, and are integrated into a power parameter (operation rate) for the entire system by the service power rate allocation calculator 102. The specific method is the same as the method which has already been described with reference to FIG. 9 and hence, the detailed description thereof is not repeated. In FIG. 23, the modem, the IrDA device, the IEEE 1394 device, the USB device, the audio device, and the 3D function device are added to the resources (devices) shown in FIG. 9.

Referring now to FIGS. 24 to 29, description is made of the calculation of power parameters which is done in the service power rate allocation calculator 102.

FIG. 24 shows an example of the calculation of power parameters (operation rates) for the CPU in a case where no application program is being operated. When the system is being operated, and no application program is being operated, the power parameters (operation rates) for the entire system shown in FIG. 14 are applied. That is, the status of the system is "In Idle", so that the operation rate 10% for the CPU at the time of the status "In Idle" shown in FIG. 14 is set as the power parameter for the CPU.

FIG. 25 shows an example of the calculation of power parameters for the CPU in a case where only one application program in which no peculiar power parameters are designated is being operated. That is, the status of the application program is "In Activation Process", so that the operation rate 50% for the CPU in the status "In Activation Process" shown in FIG. 16 is set as the power parameter for the CPU in this example.

FIG. 26 shows an example of the calculation of power parameters for the CPU in a case where an application program in which no peculiar power parameters are designated and an application program in which peculiar power parameters are designated are being simultaneously operated. The status of the application program 1 in which no peculiar power parameters are designated is "In Wait for Key Operation", so that an operation rate of 30% is read out of the parameters shown in FIG. 17. A peculiar power parameter (operation rate) is previously designated in the status "Application Program 2 for Video Recording", so that the power parameters shown in FIG. 15 are applied. The status of the application program 2 is "In Video Record", an operation rate of 80% is read out of the parameters shown in FIG. 15. The power parameters (operation rates) will be calculated in accordance with the calculation method exemplified in FIG. 23. That is, when the operation rate 30% and the operation rate 80% are summed, the operation rate is 110%. Since the operation rate exceeds 100%, the operation rate which is the power parameter for the CPU is set at 100% in accordance with the calculation method exemplified in FIG. 23. The operation rate is a set value of the power parameter for the CPU.

FIG. 27 shows an example of the calculation in a case where two application programs in which no peculiar power parameters are designated are being operated. The operation status of an application program 1 is "In Wait for Key Operation", and the operation status of an application program 2 is "In Key Operation". As the power parameter for the CPU in the status "In Wait for Key Operation", an operation rate of 30% is read out of the parameters shown in FIG. 26. The power parameters shown in FIG. 17 are applied to the application program in the status "In Key Operation". An operation rate of 50% is read out as the power parameter for the CPU in the status "In Key Operation". When the calculation method shown in FIG. 23 is applied, the operation rate is 80%. The operation rate becomes the power parameter to be set for the CPU.

FIG. 28 shows an example of the calculation of power parameters for the modem in a case where two application programs are operated. The operation status detector 101 detects that the operation status of the application program 2 is "In Communication" using the modem. The service power rate allocation calculator 102 acquires an operation rate of 100% as the power parameter for the modem in the status "In Communication" shown in FIG. 18 from the service power rate storage 103. On the other hand, the application program 1 does not use the modem, so that an operation rate of 0% is acquired as the power parameter for the modem. When the calculation method relating to the modem shown in FIG. 23 is applied, the power parameter for the modem in this case is 100%.

FIG. 29 illustrates an example of the calculation of power parameters for the audio device in a case where two application programs are operated. The operation status detector 101 detects that the operation status of the application program 2 is "In Audio Replay". The service power rate allocation calculator 102 reads out the corresponding power parameter from the service power rate storage 103. On the other hand, the operation status of the application program 1 is not "In Audio Replay", so that an operation rate of 0% is read out as the power parameter. When the calculation method relating to the audio device shown in FIG. 23 is applied, an operation rate of 100% is obtained as the power parameter for the audio device.

The respective power parameters (operation rates) obtained as described with reference to FIGS. 24 to 29 are handed to the service power rate allocator 104 from the service power rate allocation calculator 102, so that the devices 1200_1 to 1200_N are finally set (step S11).

Although in the above-mentioned example, description was made, assuming that the power parameters are previously stored in the service power rate storage 103, the user may be able to set power parameters corresponding to the operation status of the API when required.

FIG. 32 shows the statuses detected by the operation status detector 101 and the contents of the outputted operation status signal S1 while the electrical apparatus incorporating the power control apparatus PCA2 is being operated. The operation status of the system where "Operation" is displayed as "System" will be first described. The status "In Activation Process" means a time period elapsed from the time when the operation status detector 101 outputs the signal MSS1 shown in FIG. 30 until the signal MSS2 is then outputted. The status "In Idle" means a time period elapsed from the time when the signal MSS3 is outputted until the signal MSS4 is outputted. The status "In Suspend" means a time period elapsed from the time when the signal MSS5 is outputted until the signal MSS6 is outputted. The status "In Termination Process" means a time period elapsed from the time when the signal MSS7 is outputted until the signal MSS8 is outputted. The status "Termination" means a time period elapsed from the time when the signal MSS8 is outputted.

Next, the operation status of the application program where "Operation" is displayed as "Standard Application Program" will be described. The status "In Activation Process" means a time period elapsed from the time when the operation status detector 101 outputs the signal MSA1 shown in FIG. 31 until the signal MSA2 is outputted. Similarly, the signals MSA corresponding to the respective periods "In Image Display", "In Video Record", "In Input", "In Wait", "In Save Process", "Modem Open", "Modem in Communication", "IrDA Open", "IrDA in Communication", "IEEE 1394 I/F Open", "IEEE 1394 I/F in Com.", "USB Device Open", "USB Device in Com.", "3D Function in Act", "Audio Replay", "In Video Replay", and "In Termination Process" are specifically described.

Furthermore, description is made of the operation status of the application program where "Operation" is displayed as "Application Program For Video Display/Record". The status "In Activation Process" means a time period elapsed from the time when the operation status detector 101 outputs the signal MSA1 until the subsequent signal MSA2 is then outputted. The status "In Display" means a time period elapsed from the time when the signal MSA5 is outputted until the signal MSA6 is outputted. The status "In Video Record" means a time period elapsed from the time when the signal MSA7 is outputted until the signal MSA8 is outputted. The status "In Termination Process" means a time period elapsed from the time when the signal SMA3 is outputted until the signal MSA4 is outputted.

As described in the foregoing, according to the present invention, power is properly and effectively distributed among resources depending on the operation status of an application program, thereby making it possible to prevent the power from being uselessly consumed by being excessively supplied and to reduce the power consumption.

Furthermore, according to the present invention, it is possible to save time and labor required to perform power control setting manually when an application program requiring the performances of a CPU and peripherals is used, and to set the power consumption to a minimum when no application program is operated.

Furthermore, each of the resources is operated by an amount of power actually required to run the application program, so that power can be prevented from being unnecessarily consumed. When a load factor, which has been set once, peculiar to the resource is changed, or the resource is replaced with another resource, or when the operation of the application program is changed, the load factor can be also reset to a proper value.

In performing each of the operations of the application program, a load simultaneously required of the same resource can be correctly determined depending on a load corresponding to the entire system. It is possible to respond to a load request from the application program to the utmost depending on the actual capability of the resource. The present invention is also applicable to a computer system having the operation system. It is possible to control the power consumption of the arbitrary peripheral connected to the computer system.

It is possible to control the power consumption utilizing an operation control function provided in each of the resources. Further, each of the resources is operated by an amount of power actually required to run the application program, thereby making it possible to prevent power from being unnecessarily consumed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power control apparatus for controlling a load of at least one resource in an electrical apparatus for running an application program, said power control apparatus comprising:
   an operation status detecting means for detecting an operation status of the application program;
   a load determination means for determining a load required for operating the resource such that the resource can function in the detected operation status of the application program; and
   a resource operation control means for controlling an operation parameter which affects the load of the resource such that the resource is operated by the required load,
   wherein said power control apparatus is capable of providing a minimum power that is sufficient to run the application program in view of the required load.

2. The power control apparatus according to claim 1, wherein said load determination means comprises:
   a load factor storage means for storing a previously set load factor for the resource for the operation status of the application program; and a load factor acquisition means for reading out from said load factor storage means the previously set load factor, wherein the previously set load factor is in a range particular to the resource depending on the load.

3. The power control apparatus according to claim 2, wherein said load determination means further comprises a load factor integration means for integrating a plurality of load factors when the plurality of load factors are acquired for the resource by said load factor acquisition means, and wherein said power control apparatus is capable of providing a minimum power, which is sufficient in view of the loads for driving the resource.

4. The power control apparatus according to claim 3, wherein said load factor integration means integrates the plurality of load factors into the sum of the load factors when the sum of the load factors is not more than 100%, and wherein said load factor integration means sets the sum of the load factors to 100% when the sum of the load factors is not less than 100% to prevent the power control apparatus from providing power to the resource in excess of a maximum capability of the resource.

5. The power control apparatus according to claim 3, wherein said load factor integration means is operable to supply the load factor obtained by the integration to a driver interface layer in an operation system loaded into the electrical apparatus.

6. The power control apparatus according to claim 5, wherein the driver interface layer is operable to supply the load factor obtained by the integration to the drivers.

7. The power control apparatus according to claim 2, wherein the load factor is an operation rate for the resource.

8. The power control apparatus according to claim 7, wherein said load determination means is further operable to determine a load required for each of a plurality of resources such that said power control apparatus is capable of providing a minimum power that is sufficient to run the application program in view of the required load for each of the plurality of resources.

9. The power control apparatus according to claim 1, wherein said operation status detecting means is operable to detect the operation status of the application program on the basis of API communication information detected by an API layer in an operation system loaded into said electrical apparatus and operation status monitor information detected by a Kernel layer.

10. The power control apparatus according to claim 1, wherein said load determination means is further operable to determine a load required for each of a plurality of resources such that said power control apparatus is capable of providing a minimum power that is sufficient to run the application program in view of the required load for each of the plurality of resources.

11. A power control method of controlling the power consumption of each of resources for running an application program in an electrical apparatus for running the application program, comprising:

detecting an operation status of the application program;

determining a load required for operating the resource such that the resource can function in the detected operation status of the application program; and controlling an operation parameter which affects the load of the resource such that the resource is operated by the required load, wherein said method is capable of providing a minimum power to the resource that is sufficient to run the application program in view of the required load.

12. The power control method according to claim 11, wherein said determining the required load comprises:

storing previously set load factors for the resources based on the operation statuses of said application program; and reading out a load factor from the stored previously set load factors for the resource corresponding to the detected operation status, and wherein the load factor is set in a range particular to the resource depending on said load.

13. The power control method according to claim 12, wherein said determining the required load further comprises integrating a plurality of load factors when the plurality of load factors are acquired for the resource, and wherein said power control method is capable of providing a minimum power, which is sufficient in view of the loads for driving the resource.

14. The power control method according to claim 13, wherein said integrating comprises integrating the plurality of load factors into the sum of the load factors when the sum of the load factors acquired for the resource is not more than 100%, and wherein said integrating comprises setting the sum of the load factors to 100% when the sum of the load factors is not less than 100% to prevent power from being applied to the resource in excess of the maximum capability of the resource.

15. The power control method according to claim 13, further comprising supplying the load factor obtained by the integration to a driver interface layer in an operation system loaded into the electrical apparatus.

16. The power control method according to claim 15, further comprising supplying the load factor obtained by the integration to drivers for the corresponding resources.

17. The power control method according to claim 12, wherein the load factor is an operation rate for the resource.

18. The power control method according to claim 11, wherein said detecting the operation status comprises detecting the operation status of the application program on the basis of API communication information detected by an API layer in an operation system loaded into said electrical apparatus and operation status monitor information detected by a Kernel layer.

19. A computer system comprising:

a processor;

a plurality of resources; and a memory coupled to said processor, the memory having stored thereon an application program and a sequence of instructions which, when executed by said processor, cause the processor to control the power consumption of each of the resources for running the application program by:

detecting an operation status of the application program;

determining a required load of the resource such that the resource can function in the detected operation status of the application program; and controlling an operation parameter which affects a load of the resource such that the resource is operated by the required load, wherein said computer system is capable of providing a minimum power to the resource that is sufficient to run the application program in view of the required load.

20. A computer-readable medium having stored thereon a plurality of sequences of instructions, said plurality of sequences of instructions including sequences of instructions which, when executed by a processor, cause the processor to control the power consumption of each of a plurality of resources for running an application program by:

detecting an operation status of the application program;

determining a required load of the resource such that the resource can function in the detected operation status of the application program; and controlling an operation parameter which affects a load of the resource such that the resource is operated by the required load, wherein said processor is capable of providing a minimum power to the resource that is sufficient to run the application program in view of the required load.

\* \* \* \* \*